United States Patent
Wong et al.

(10) Patent No.: US 12,497,094 B2
(45) Date of Patent: Dec. 16, 2025

(54) COLLABORATIVE STEERING IN STEER-BY-WIRE SYSTEMS FOR AUTOMATED DRIVING

(71) Applicant: GM Global Technology Operations LLC, Detroit, MI (US)

(72) Inventors: Kin Man Michael Wong, Thornhill (CA); Ben MacCallum, Toronto (CA); Puneet Bagga, Etobicoke (CA); Parisa Mahvelatishamsabadi, North York (CA); Reza Zarringhalam, Whitby (CA)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 128 days.

(21) Appl. No.: 18/627,858

(22) Filed: Apr. 5, 2024

(65) Prior Publication Data
US 2025/0313259 A1    Oct. 9, 2025

(51) Int. Cl.
*B62D 5/00* (2006.01)
*B60W 10/20* (2006.01)
(Continued)

(52) U.S. Cl.
CPC ............ *B62D 5/006* (2013.01); *B60W 10/20* (2013.01); *B60W 60/0053* (2020.02);
(Continued)

(58) Field of Classification Search
CPC ........ B62D 5/006; B62D 5/008; B62D 6/002; B60W 10/20; B60W 60/0053; B60W 2520/10; B60W 2710/20
(Continued)

(56) References Cited

U.S. PATENT DOCUMENTS

2022/0402544 A1* 12/2022 Stutts .................. B62D 5/0487
2023/0077259 A1*  3/2023 Katzourakis ........ B60W 60/001
(Continued)

FOREIGN PATENT DOCUMENTS

| DE | 102018109705 A1 | 10/2018 |
| DE | 102019112643 A1 | 12/2019 |
| DE | 102020106479 A1 | 10/2020 |

*Primary Examiner* — Yi-Kai Wang
(74) *Attorney, Agent, or Firm* — Vivacqua Crane, PLLC

(57) ABSTRACT

A system for collaborative steering in steer-by-wire (SBW) vehicles includes sensors, a rack motor altering a position of the vehicle's steerable road wheels and an emulator altering a torque and position of a vehicle hand wheel. A collaborative steering system application (CSSA) obtains, static and dynamic information about the vehicle and the vehicle's environment, and generates a rack torque and/or angle command to the rack motor and an emulator torque and/or angle command to the emulator. The CSSA adjusts between ADAS and manual steering ratios and automatically transitions control between ADAS SBW control and manual control. The CSSA smooths transitions between ADAS SBW control and manual steering control and adjusts hand wheel stiffness by altering the emulator torque command, and causes the rack motor and emulator to operate according to a kinematic model while adapting road wheel response and vehicle operator steering feel based on scenarios and features currently enabled.

20 Claims, 7 Drawing Sheets

(51) Int. Cl.
*B60W 60/00* (2020.01)
*B62D 6/00* (2006.01)

(52) U.S. Cl.
CPC .............. *B62D 5/008* (2013.01); *B62D 6/002* (2013.01); *B60W 2520/10* (2013.01); *B60W 2710/20* (2013.01)

(58) Field of Classification Search
USPC .......................................................... 701/41
See application file for complete search history.

(56) References Cited

U.S. PATENT DOCUMENTS

2024/0270275 A1* 8/2024 Sharma .................. B62D 1/046
2025/0251308 A1* 8/2025 Tong ................... G01M 13/028

* cited by examiner

COLLABORATIVE STEERING IN STEER-BY-WIRE SYSTEMS FOR AUTOMATED DRIVING

INTRODUCTION

The present disclosure relates to steering systems in vehicles, and more specifically to electronic power steering (EPS) systems utilizing steer-by-wire (SBW) in such vehicles. SBW systems are the successors of conventional automotive manually, hydraulically, and electrically powered steering systems. However, in SBW systems, there is no mechanical connection between the steering wheel and the steering rack and the steerable wheels. Such systems consist primarily of two elements: a road wheel actuator for setting the road wheel angle, and a steering wheel actuator that may provide steering effort or feel. The lack of steering column and the indirect feedback torque on the steering wheel provided by the steering wheel actuator may result in altered or missing feedback torque relating to vehicle dynamics, including acceleration, deceleration, lateral acceleration, and the like, because such movements only directly affect the road wheel actuator. In addition, traditional SBW systems may result in driver/operator confusion or discomfort relating to a sense of disconnectedness between the steering wheel and the steerable road wheels due to inconsistent responses of the road wheel actuator in relation to the steering wheel movement and steering wheel actuator movement.

Accordingly, while current SBW systems and methods operate for their intended purpose, there is a need in the art for new and improved SBW systems and methods that may be used with automated driving systems, and which improve operator comfort, increase a sense of connectedness between movements of the road wheels and the steering wheel, and which provide for effective and smooth transitions between autonomous driving and manual steering movements while maintaining or decreasing system component complexity, providing redundancy, and which may be applied both to new vehicles and retrofitted to existing vehicles with appropriate hardware.

SUMMARY

According to several aspects of the present disclosure, a system for collaborative steering in steer-by-wire (SBW) equipped vehicles includes a vehicle, and one or more sensors equipped to the vehicle and collecting static and dynamic information about the vehicle, and an environment surrounding the vehicle. The system further includes a steering rack motor disposed on a steering rack of the vehicle, the steering rack motor selectively adjusting an angular position of one or more steerable road wheels of the vehicle. A steering emulator is connected to a hand wheel of the vehicle and selectively generates a torque to and adjusts an angular position of the hand wheel. The steering emulator and the steering rack motor are in electronic communication with one another. The system further includes a controller having a processor, a memory, and one or more input/output (I/O) ports. The I/O ports communicate with the one or more sensors and the steering rack motor and the steering emulator. The processor executes programmatic control logic stored in the memory. The programmatic control logic includes a collaborative steering system application (CSSA). The CSSA includes at least first, second, third, fourth, fifth, sixth, and seventh control logics. The first control logic obtains, from the one or more sensors and from the steering emulator and the steering rack motor, static and dynamic information about the vehicle and the environment surrounding the vehicle. In response to the static and dynamic information, the second control logic generates one or more of a rack torque command and a rack angle command to the steering rack motor and generates one or more of an emulator torque command and an emulator angle command to the steering emulator. The third control logic determines a steering ratio between angular movement of the steerable road wheels and angular movement of the hand wheel. The steering ratio is dynamically adjustable from at least an ADAS steering ratio to a manual steering ratio different from the ADAS steering ratio. The fourth control logic selectively automatically transitions vehicle steering control between automated driver assistance system (ADAS) SBW control and manual steering control. The fifth control logic smooths transitions between ADAS SBW control and manual steering control. The sixth control logic automatically and dynamically adjusts a hand wheel stiffness by altering the emulator torque command in response to data from the one or more sensors and from the steering emulator and the steering rack motor. The seventh control logic coordinates a vehicle operator feedback control loop with a trajectory tracking control loop for ADAS, and causes the steering rack motor and the steering emulator to operate according to a kinematic model of a mechanical linkage between the steering rack, the hand wheel, and the steerable road wheels while providing variable control gains that adapt road wheel response and vehicle operator steering feel based on driving scenario and driving features currently enabled.

In another aspect of the present disclosure, the first control logic further includes control logic for obtaining static and dynamic information about the vehicle including: a vehicle speed, a presence or absence of a trailer attached to the vehicle, a current road wheel angle, a current hand wheel angle. The first control logic further includes control logic for obtaining information about the environment surrounding the vehicle including: a topology of a road segment proximate the vehicle, a road type, a lane quality, a look ahead curvature, current weather conditions, a field of view and view range of the one or more sensors, object detection confidence, a lateral distance to surrounding vehicles, a size of a side threat, a presence of an intersection, and a potential evasive steering maneuver.

In yet another aspect of the present disclosure the second control logic further includes control logic that determines a desired steerable road wheel angle and communicates the rack torque and/or angle command to the steering rack motor. Upon receipt of the rack torque and/or angle command, the steering rack motor generates a torque output that alters an angle of the steerable road wheels. The second control logic further determines a desired hand wheel angle based in part on the steerable road wheel angle and a steering ratio at a current time step; and communicates the emulator torque and/or angle command to the steering emulator. Upon receipt of the emulator torque and/or angle command, the steering emulator generates a torque output that alters an angle of the hand wheel.

In still another aspect of the present disclosure the third control logic dynamically adjusts the steering ratio in response to the static and dynamic information about the vehicle, and the environment surrounding the vehicle.

In yet another aspect of the present disclosure the fourth control logic selectively and automatically transitions vehicle steering control between automated driver assistance system (ADAS) SBW control and manual steering control, based on the static and dynamic information about the vehicle and the environment surrounding the vehicle, based on a currently active ADAS feature, and based on a current hands on or hands off operational state of the hand wheel.

In still another aspect of the present disclosure the hands on and hands off operational states of the hand wheel are dictated by a touch sensor that ascertains a presence and/or absence of a vehicle operator's hands on the hand wheel. Upon determining that the vehicle is operating in a hands off operational state, the system selectively engages a feature escalation state that requests the vehicle operator take control of the steering.

In yet another aspect of the present disclosure the fifth control logic smooths transitions between ADAS SBW control and manual steering control by maintaining feedback to the hand wheel during assisted driving and controlling a timing and rate of transition with a transition factor $\alpha$. The transition factor $\alpha$ depends on vehicle speed, stable in lane condition, and time since ADAS SBW control disengagement occurred; such that:

$$K_{steer} = \alpha K_{steer_{Norm}} + (1 - \alpha) K_{steer_{ADAS}};$$

$\alpha = f(\text{vehicle sped, stable in lane, time since } ADAS \text{ override}) \in [0, 1];$ and $$\delta_{rwa_{cmnd_{norm}}} = \frac{\delta_{hwa}}{K_{steer}},$$

where $K_{steer_{ADAS}}$ is the ADAS steering ratio defined as $$K_{steer_{ADAS}} = \frac{\delta_{hwa_{ADAS}}}{\delta_{rwa_{cmnd_{ADAS}}}};$$

$K_{steer_{Norm}}$, is the manual steering ratio defined as $$K_{steer_{Norm}} = \frac{\delta_{hwa}}{\delta_{rwa_{cmnd_{norm}}}};$$

$\delta_{hwa_{ADAS}}$ is a hand wheel angle commanded by ADAS, and $$\delta_{rwa_{cmnd_{ADAS}}}$$

is a road wheel angle commanded by ADAS; $\delta_{hwa}$ is an operator-commanded hand wheel angle;

$$\delta_{rwa_{cmnd_{norm}}}$$

is a road wheel angle commanded by the vehicle operator.

In still another aspect of the present disclosure the sixth control logic automatically and dynamically adjusts a hand wheel stiffness by adjusting steering emulator torque outputs based on static and dynamic information about the vehicle and information about the environment surrounding the vehicle obtained within the first control logic, and based on vehicle operator attentiveness levels, vehicle operator historical preferences, ADAS SBW control trajectory tracking performance and availability, including obstacles identified by the one or more sensors. The sixth control logic further identifies obstacles and both inhibits the vehicle operator from causing the vehicle to collide with the obstacles and assists the vehicle operator in navigating dynamic driving scenarios by dynamically adjusting a steering ratio gain and altering an effectiveness of vehicle operator inputs to the hand wheel.

In yet another aspect of the present disclosure the seventh control logic includes control logic for collaborative steering feedback that receives vehicle state information, control commands, and steering characteristics and generates a hand wheel torque overlay command. The hand wheel torque overlay command is sent to the steering emulator and overlayed with vehicle operator torque inputs, and a coordinated desired steering angle command is sent to the steering rack motor. The hand wheel torque overlay is defined as:

$$\Delta\tau_{df} = f(\tau_d, p_d, p_s, \dot{x}, \dot{\delta}, \delta_{ref}, m) - k_v \dot{\delta} \times [\alpha_d(\dot{x}, \dot{\delta}, \delta_{ref})p_d + \alpha_s(\dot{x}, \dot{\delta})p_s]$$

where $\tau_d$ is a vehicle operator applied hand wheel torque; $p_d$ is a vehicle operator preference; $p_s$ is a steering feel customization trigger; $\delta$ is a measured road wheel angle; e is a trajectory following error; x is a vehicle state; m is a steering performance mode; $\delta_{ref}$ is a desired steering angle command; $\delta_c$ is a road wheel angle command; and $k_v$ is a variable gain.

In still another aspect of the present disclosure a method for collaborative steering in steer-by-wire (SBW) equipped vehicles includes: collecting, with one or more sensors equipped to and disposed on a vehicle, and static and dynamic information about the vehicle, and an environment surrounding the vehicle. The method further includes selectively adjusting an angular position of one or more steerable road wheels of the vehicle with a steering rack motor disposed on a steering rack of the vehicle, and selectively generating a torque to and adjusting an angular position of a hand wheel with a steering emulator connected to the hand wheel of the vehicle, the steering emulator and the steering rack motor in electronic communication with one another. The method further includes executing programmatic control logic including a collaborative steering system application (CSSA) stored in memory of a controller of the vehicle. The controller has a processor, the memory, and one or more input/output (I/O) ports. The I/O ports communicates with the one or more sensors and the steering rack motor and the steering emulator. The CSSA includes: obtaining, from the one or more sensors and from the steering emulator and the steering rack motor, static and dynamic information about the vehicle and the environment surrounding the vehicle, and generating, in response to the static and dynamic information, one or more of a rack torque command and a rack angle command to the steering rack motor and generates one or more of an emulator torque and/or angle command to the steering emulator. The CSSA determines a steering ratio between angular movement of the steerable road wheels and angular movement of the hand wheel. The steering ratio is dynamically adjustable from at least an ADAS steering ratio to a manual steering ratio different from the ADAS steering ratio. The CSSA selectively automatically transitions vehicle steering control between automated driver assistance system (ADAS) SBW control and manual steering control, smooths transitions between ADAS SBW control and manual steering control. The CSSA automatically and dynamically adjusts a hand wheel stiffness by altering the emulator torque command in response to data from the one or more sensors and from the steering emulator and the steering rack motor. The CSSA coordinates a vehicle operator feedback control loop with a trajectory tracking control loop for ADAS, and causes the steering rack motor and the steering emulator to operate according to a kinematic model of a mechanical linkage between the steering rack, the hand wheel, and the steerable road wheels while providing variable control gains that adapt road wheel response and vehicle operator steering feel based on driving scenario and driving features currently enabled.

In yet another aspect of the present disclosure the method obtains static and dynamic information about the vehicle including: a vehicle speed, a presence or absence of a trailer attached to the vehicle, a current road wheel angle, a current hand wheel angle; and obtains information about the environment surrounding the vehicle including: a topology of a road segment proximate the vehicle, a road type, a lane quality, a look ahead curvature, current weather conditions, a field of view and view range of the one or more sensors, object detection confidence, a lateral distance to surrounding vehicles, a size of a side threat, a presence of an intersection, and a potential evasive steering maneuver.

In still another aspect of the present disclosure the method further includes determining a desired steerable road wheel angle and communicating the rack torque and/or angle command to the steering rack motor. Upon receipt of the rack torque and/or angle command, the steering rack motor generates a torque output that alters an angle of the steerable road wheels. The method further includes determining a desired hand wheel angle based in part on the steerable road wheel angle and a steering ratio at a current time step; and communicating the emulator torque and/or angle command to the steering emulator. Upon receipt of the emulator torque and/or angle command, the steering emulator generates a torque output that alters an angle of the hand wheel.

In yet another aspect of the present disclosure the method further includes dynamically adjusting the steering ratio in response to the static and dynamic information about the vehicle, and the environment surrounding the vehicle.

In still another aspect of the present disclosure the method further includes selectively and automatically transitioning vehicle steering control between automated driver assistance system (ADAS) control and manual steering control, based on the static and dynamic information about the vehicle and the environment surrounding the vehicle, based on a currently active ADAS feature, and based on a current hands on or hands off operational state of the hand wheel.

In yet another aspect of the present disclosure the method further includes dictating the hands on and hands off operational states of the hand wheel via a touch sensor that ascertains a presence and/or absence of a vehicle operator's hands on the hand wheel. Upon determining that the vehicle is operating in a hands off operational state, the system selectively engages a feature escalation state that requests the vehicle operator take control of the steering.

In still another aspect of the present disclosure the method further includes smoothing transitions between ADAS SBW control and manual steering control by maintaining feedback to the hand wheel during assisted driving and controlling a timing and rate of transition with a transition factor $\alpha$. The transition factor $\alpha$ depends on vehicle speed, stable in lane condition, and time since ADAS SBW control disengagement occurred, such that:

$$K_{steer} = \alpha K_{steer_{Norm}} + (1-\alpha) K_{steer_{ADAS}};$$

$$\alpha = f(\text{vehicle sped, stable in lane, time since } ADAS \text{ override}) \in [0, 1];$$

and $$\delta_{rwa_{cmnd_{norm}}} = \frac{\delta_{hwa}}{K_{steer}},$$

where $K_{steer_{ADAS}}$ is the ADAS steering ratio defined as $$K_{steer_{ADAS}} = \frac{\delta_{hwa_{ADAS}}}{\delta_{rwa_{cmnd_{ADAS}}}};$$

$K_{steer_{Norm}}$, is the manual steering ratio defined as $$K_{steer_{Norm}} = \frac{\delta_{hwa}}{\delta_{rwa_{cmnd_{norm}}}};$$

$\delta_{hwa_{ADAs}}$ is a hand wheel angle commanded by ADAS, and $$\delta_{rwa_{cmnd_{ADAS}}}$$

is a road wheel angle commanded by ADAS; $\delta_{hwa}$ is an operator-commanded hand wheel angle;

$$\delta_{rwa_{cmnd_{norm}}}$$

is a road wheel angle commanded by the vehicle operator.

In yet another aspect of the present disclosure the method further includes automatically and dynamically adjusting a hand wheel stiffness by adjusting steering emulator torque outputs based on static and dynamic information about the vehicle and information about the environment surrounding the vehicle obtained within by the one or more sensors, from the steering rack motor and from the steering emulator, and based on vehicle operator attentiveness levels, vehicle operator historical preferences, ADAS SBW control trajectory tracking performance and availability, including obstacles identified by the one or more sensors. The method further includes identifying obstacles and both inhibiting the vehicle operator from causing the vehicle to collide with the obstacles and assisting the vehicle operator in navigating dynamic driving scenarios by dynamically adjusting a steering ratio gain and altering an effectiveness of vehicle operator inputs to the hand wheel.

In still another aspect of the present disclosure the method further includes activating collaborative steering feedback and receiving vehicle state information, control commands, and steering characteristics; and generating a hand wheel torque overlay command. The hand wheel torque overlay command is sent to the steering emulator and overlayed with vehicle operator torque inputs, and a coordinated desired steering angle command is sent to the steering rack motor. The hand wheel torque overlay is defined as:

$$\Delta \tau_{df} = f(\tau_d, p_d, p_s, \dot{x}, \delta, \delta_{ref}, m) = k_v \delta \times [\alpha_d(\dot{x}, \delta, \delta_{ref})p_d + \alpha_s(\dot{x}, \delta)p_s]$$

where $\tau_d$ is a vehicle operator applied hand wheel torque; $p_d$ is a vehicle operator preference; $p_s$ is a steering feel customization trigger; $\delta$ is a measured road wheel angle; e is a trajectory following error; x is a vehicle state; m is a steering performance mode; $\delta_{ref}$ is a desired steering angle command; $\delta_c$ is a road wheel angle command; and $k_v$ is a variable gain.

In yet another aspect of the present disclosure a system for collaborative steering in steer-by-wire (SBW) equipped vehicles, includes a vehicle, and one or more sensors equipped to the vehicle and collecting static and dynamic information about the vehicle, and an environment surrounding the vehicle. The system further includes a steering rack motor disposed on a steering rack of the vehicle, the steering rack motor selectively adjusting an angular position of one or more steerable road wheels of the vehicle, and a steering emulator connected to a hand wheel of the vehicle and selectively generating a torque to and adjusting an angular position of the hand wheel, the steering emulator and the steering rack motor in electronic communication with one another. The system further includes a controller having a processor, a memory, and one or more input/output (I/O) ports. The I/O ports communicate with the one or more sensors and the steering rack motor and the steering emulator. The processor executes programmatic control logic stored in the memory, the programmatic control logic including a collaborative steering system application (CSSA). The CSSA includes at least first, second, third, fourth, fifth, sixth, and seventh control logics. The first control logic obtains, from the one or more sensors and from the steering emulator and the steering rack motor, static and dynamic information about the vehicle and the environment surrounding the vehicle, including: a vehicle speed, a presence or absence of a trailer attached to the vehicle, a current road wheel angle, a current hand wheel angle, and that obtains information about the environment surrounding the vehicle including: a topology of a road segment proximate the vehicle, a road type, a lane quality, a look ahead curvature, current weather conditions, a field of view and view range of the one or more sensors, object detection confidence, a lateral distance to surrounding vehicles, a size of a side threat, a presence of an intersection, and a potential evasive steering maneuver. In response to the static and dynamic information, the second control logic generates one or more of a rack torque command and a rack angle command to the steering rack motor and generates one or more of an emulator torque command and an emulator angle to the steering emulator. The second control logic determines a desired steerable road wheel angle and communicates the rack torque and/or angle command to the steering rack motor. Upon receipt of the rack torque and/or angle command, the steering rack motor generates a torque output that alters an angle of the steerable road wheels; and determines a desired hand wheel angle based in part on the steerable road wheel angle and a steering ratio at a current time step. The second control logic also communicates the emulator torque and/or angle command to the steering emulator. Upon receipt of the emulator torque and/or angle command, the steering emulator generates a torque output that alters an angle of the hand wheel. The third control logic determines a steering ratio between angular movement of the steerable road wheels and angular movement of the hand wheel. The steering ratio is dynamically adjustable from at least an ADAS steering ratio to a manual steering ratio different from the ADAS steering ratio and dynamically adjusts the steering ratio in response to the static and dynamic information about the vehicle, and the environment surrounding the vehicle. The fourth control logic selectively and automatically transitions vehicle steering control between automated driver assistance system (ADAS) SBW control and manual steering control, based on the static and dynamic information about the vehicle and the environment surrounding the vehicle, based on a currently active ADAS feature, and based on a current hands on or hands off operational state of the hand wheel. The fifth control logic smooths transitions between ADAS SBW control and manual steering control by maintaining feedback to the hand wheel during assisted driving and controlling a timing and rate of transition with a transition factor $\alpha$. The transition factor $\alpha$ depends on vehicle speed, stable in lane condition, and time since ADAS SBW control disengagement occurred; such that:

$$K_{steer} = \alpha K_{steer_{Norm}} + (1 - \alpha) K_{steer_{ADAS}};$$

$\alpha = f(\text{vehicle speed, stable in lane, time since } ADAS \text{ override}) \in [0, 1];$ and $$\delta_{rwa_{cmnd_{norm}}} = \frac{\delta_{hwa}}{K_{steer}},$$

where $K_{steer_{ADAS}}$ is the ADAS steering ratio defined as $$K_{steer_{ADAS}} = \frac{\delta_{hwa_{ADAS}}}{\delta_{rwa_{cmnd_{ADAS}}}};$$

$K_{steer_{Norm}}$, is the manual steering ratio defined as $$K_{steer_{Norm}} = \frac{\delta_{hwa}}{\delta_{rwa_{cmnd_{norm}}}};$$

$\delta_{hwa_{ADAS}}$ is a hand wheel angle commanded by ADAS, and $$\delta_{rwa_{cmnd_{ADAS}}}$$

is a road wheel angle commanded by ADAS; $\delta_{hwa}$ is an operator-commanded hand wheel angle;

$$\delta_{rwa_{cmnd_{norm}}}$$

is a road wheel angle commanded by the vehicle operator. The sixth control logic automatically and dynamically adjusts a hand wheel stiffness by altering the emulator torque and/or angle command in response to data from the one or more sensors and from the steering emulator and the steering rack motor, and in response to vehicle operator attentiveness levels, vehicle operator historical preferences, ADAS SBW control trajectory tracking performance and availability, including obstacles identified by the one or more sensors; automatically identifies obstacles and both inhibits the vehicle operator from causing the vehicle to collide with the obstacles and assists the vehicle operator in navigating dynamic driving scenarios by dynamically adjusting a steering ratio gain and altering an effectiveness of vehicle operator inputs to the hand wheel. The seventh control logic coordinates a vehicle operator feedback control loop with a trajectory tracking control loop for ADAS, including control logic for collaborative steering feedback that receives vehicle state information, control commands, and steering characteristics and generates a hand wheel torque overlay command. The hand wheel torque overlay command is sent to the steering emulator and overlayed with vehicle operator torque inputs, and a coordinated desired steering angle command is sent to the steering rack motor. The hand wheel torque overlay is defined as:

$$\Delta \tau_{df} = f(\tau_d, p_d, p_s, \dot{x}, \delta, \delta_{ref}, m) = k_v \, \delta \times [\alpha_d(\dot{x}, \delta, \delta_{ref}) p_d + \alpha_s(\dot{x}, \delta) p_s]$$

where $\tau_d$ is a vehicle operator applied hand wheel torque; $p_d$ is a vehicle operator preference; $p_s$ is a steering feel customization trigger; $\delta$ is a measured road wheel angle; e is a trajectory following error; x is a vehicle state; m is a steering performance mode; $\delta_{ref}$ is a desired steering angle command; $\delta_c$ is a road wheel angle command; and $k_v$ is a variable gain. The seventh control logic further causes the steering rack motor and the steering emulator to operate according to a kinematic model of a mechanical linkage between the steering rack, the hand wheel, and the steerable road wheels while providing variable control gains that adapt road wheel response and vehicle operator steering feel based on driving scenario and driving features currently enabled.

In still another aspect of the present disclosure the hands on and hands off operational states of the hand wheel are dictated by a touch sensor that ascertains a presence and/or absence of a vehicle operator's hands on the hand wheel. Upon determining that the vehicle is operating in a hands off operational state, the system selectively engages a feature escalation state that requests the vehicle operator take control of the steering.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
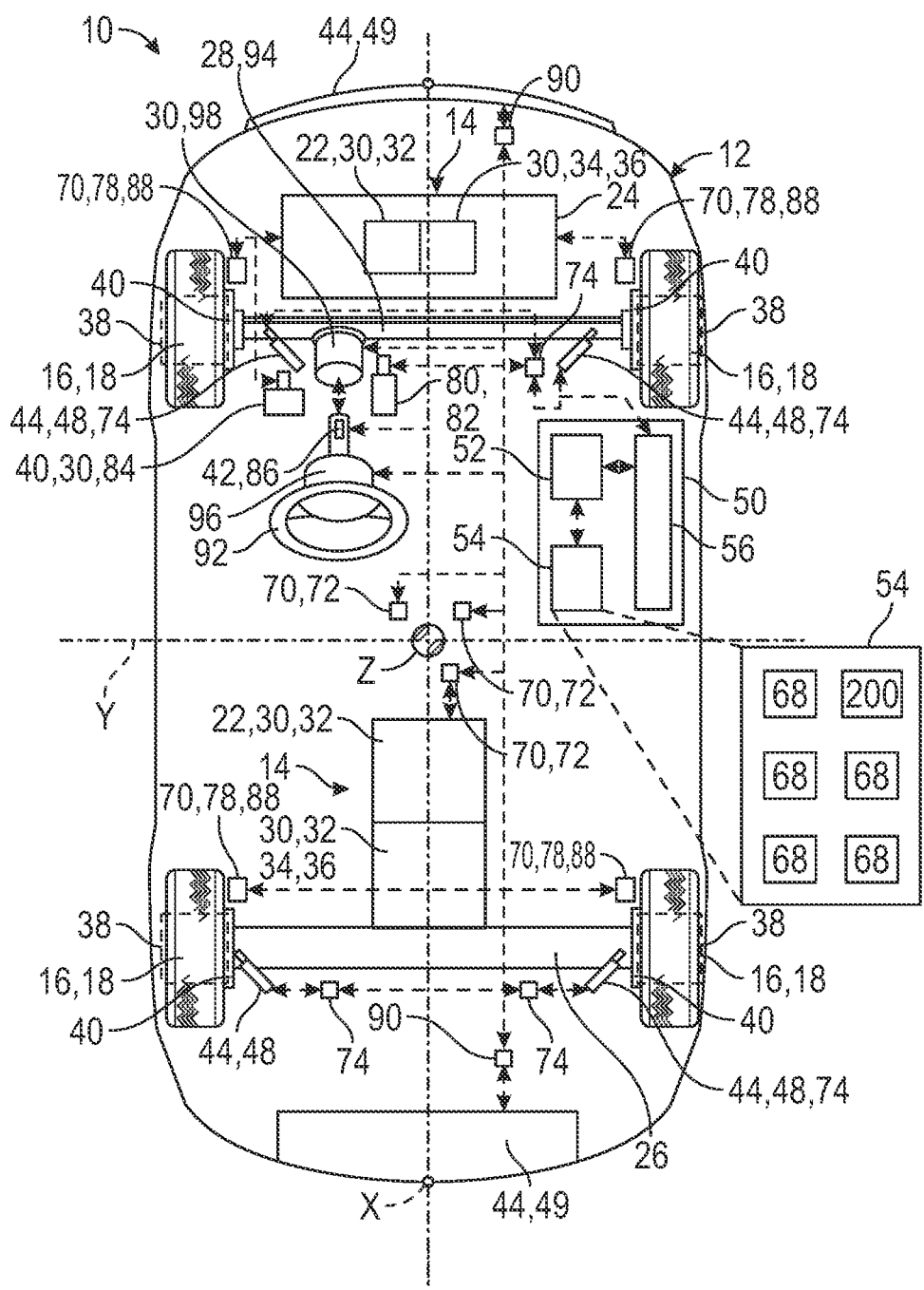
FIG. 1 is a schematic diagram of a system for collaborative steering in steer-by-wire (SBW) systems for automated driving in vehicles according to an exemplary embodiment.

Referring to FIG. 1, a system 10 for collaborative steering in steer-by-wire (SBW) systems for automated driving in vehicles 12 is shown in schematic form. The system 10 operates on the vehicle 12. While the vehicle 12 shown is a car, it should be appreciated that the vehicle 12 may be a van, bus, tractor-trailer, semi, SUV, truck, bicycle, e-bike, tricycle, motorcycle, airplane, helicopter, amphibious vehicle, or any other such vehicle without departing from the scope or intent or the present disclosure. In the example shown in FIG. 1, the vehicle 12 is equipped with a powertrain 14 which is capable of transmitting motive force to road wheels 16 of the vehicle, and to tires 18 affixed to the road wheels 16. The powertrain 14 may include a variety of components, such as internal combustion engines (ICE) 20, and/or electric motors 22, as well as transmissions 24 capable of transmitting torque from the ICEs 20, and/or electric motors 22 to the road wheels 16. In one example, the vehicle 12 may include an ICE 20 acting on a rear axle 26 of the vehicle 12 as well as one or more electric motors 22 acting on a front axle 28 of the vehicle 12. In additional examples, the vehicle 12 may use one or more ICEs 20, and/or one or more electric motors 22 arranged in additional configurations and providing torque to either front or rear axles 28, 26, or even to individual road wheels 16 of the vehicle 12 without departing from the scope or intent of the present disclosure.

In several aspects, the powertrain 14 includes one or more in-plane actuators 30. The in-plane actuators 30 may include all-wheel drive (AWD) systems including electronically-controlled or electric AWD (eAWD) 32 systems, as well as limited slip differentials (LSDs) 34 including electronically-controlled or electric LSD (eLSD) 36 systems. In-plane actuators 30 can generate or modify force generation in X and/or Y directions at a tire 18 to road surface contact patch 38 within a predetermined capacity. An eAWD 32 system may transfer torque from a front to a rear of the vehicle 12 and/or from side-to-side of the vehicle 12. Likewise, an eLSD 36 may transfer torque from side-to-side of the vehicle 12. In some examples, the eAWD 32 and/or eLSD 36 may directly alter or manage torque delivery from the ICE 20 and/or electric motors 22 and/or the eAWD 32 and eLSD 36 may act on a braking system 40 to adjust a quantity of torque delivered to each of the tires 18 of the vehicle 12. Additional in-plane actuators 30 may include active steering, electronic power steering (EPS) systems, and/or steer-by-wire (SBW) steering systems 42 at either or both of the front and rear axles 28, 26. Active, EPS, and/or SBW systems 42 may actively adjust an angle of the road wheels 16 relative to the longitudinal axis X of the vehicle 12.

In further examples, the vehicle 12 may include a means of altering a normal force on each of the tires 18 of the vehicle 12 via one or more out-of-plane actuators 44. The out-of-plane actuators 44 of the vehicle 12 may include any of a wide variety of actuators 44 capable of managing vertical movement of the vehicle 12. In several aspects, the out-of-plane actuators 44 may include active aerodynamic actuators 46, active suspension actuators 48, or the like. Active aerodynamic actuators 46 may actively or passively alter an aerodynamic profile of the vehicle via one or more active aerodynamic elements 49 such as wings, spoilers, fans or other suction devices, actively-managed Venturi tunnels, splitters, or the like. Active suspension actuators 48 adjust suspension travel, spring rates, and damping characteristics. In some examples, the active suspension actuators 48 may include magnetorheological dampers, pneumatic dampers or springs, or other such electrically, hydraulically, or pneumatically adjusted dampers or springs without departing from the scope or intent of the present disclosure.

The terms "forward", "rear", "inner", "inwardly", "outer", "outwardly", "above", and "below" are terms used relative to the orientation of the vehicle 12 as shown in the drawings of the present application. Thus, "forward" refers to a direction toward a front of a vehicle 12, "rearward" refers to a direction toward a rear of a vehicle 12. "Left" refers to a direction towards a left-hand side of the vehicle 12 relative to the front of the vehicle 12. Similarly, "right" refers to a direction towards a right-hand side of the vehicle 12 relative to the front of the vehicle 12. "Inner" and "inwardly" refers to a direction towards the interior of a vehicle 12, and "outer" and "outwardly" refers to a direction towards the exterior of a vehicle 12, "below" refers to a direction towards the bottom of the vehicle 12, and "above" refers to a direction towards a top of the vehicle 12. Further, the terms "top", "overtop", "bottom", "side" and "above" are terms used relative to the orientation of the actuators, and the vehicle 12 more broadly shown in the drawings of the present application. Thus, while the orientation of actuators 30, 44, or vehicle 12 may change with respect to a given use, these terms are intended to still apply relative to the orientation of the components of the system 10 and vehicle 12 components shown in the drawings.

The system 10 further includes one or more controllers 50. The controllers 50 are non-generalized electronic control devices having a preprogrammed digital computer or processor 52, non-transitory computer readable medium or memory 54 used to store data such as control logic, software applications, instructions, computer code, data, lookup tables, etc., and input/output (I/O) ports 56. Computer readable medium or memory 54 includes any type of medium capable of being accessed by a computer, such as read only memory (ROM), random access memory (RAM), a hard disk drive, solid-state memory, a compact disc (CD), digital video disc (DVD), or any other type of memory 54. A non-transitory computer readable memory 54 excludes wired, wireless, optical, or other communication links that transport transitory electrical or other signals. A non-transitory computer readable memory 54 includes media where data can be permanently stored and media where data can be stored and later overwritten, such as a rewritable optical disc or an erasable memory device. Computer code includes any type of program code, including source code, object code, and executable code. The processor 52 is configured to execute the code or instructions. The vehicle 12 may have controllers 50 including a dedicated Wi-Fi controller, an engine control module, a transmission control module, a body control module, a suspension control module, a brake control module, an infotainment control module, or the like. The I/O ports 56 may be configured to communicate via wired communications, wirelessly via Wi-Fi protocols under IEEE 802.11x, cellular links, satellite links, or the like without departing from the scope or intent or the present disclosure.

The on-board controller 50 further includes one or more applications 68. An application 68 is a software program configured to perform a specific function or set of functions. The application 68 may include one or more computer programs, software components, sets of instructions, procedures, functions, objects, classes, instances, related data, or a portion thereof adapted for implementation in a suitable computer readable program code. The applications 68 may be stored within the memory 54 or in additional or separate memory 54. In several aspects, applications 68 may manage powertrain system functions, suspension system functions, brake system functions, aerodynamic system functions, steering system functions, and/or body control system functions in an exemplary vehicle 12.

Applications 68 managing powertrain system functions, suspension system functions, brake system functions, aerodynamic system functions, steering system functions, and body control system functions in the vehicle 12 receive static and/or dynamic vehicle state information or sensory data from a suite of sensors 70 disposed on the vehicle 12. The sensors 70 may include any of a wide variety of sensors 70 including inertial measurement units (IMUs) 72, suspension control units such as Semi Active Damping Suspension (SADS) 74, global positioning system (GPS) 76 sensors, wheel speed sensors 78, throttle position sensors 80, accelerator pedal position sensors 82, brake pedal position sensors 84, steering position sensors 86, tire pressure monitoring sensors 88, aerodynamic element position sensors 90, and the like. IMUs 72 measure movement, acceleration, and the like in several degrees of freedom. In a specific example, the IMUs 72 may measure position, movement, acceleration and the like in three or more degrees of freedom. Likewise, the SADS 74 sensors may be IMUs 72 capable of measuring in three or more degrees of freedom. In some more specific examples, the SADS 74 may be suspension hub accelerometers, or the like. The sensory data may therefore include, but not be limited to: road wheel 16 speed data, SADS 74 and IMU 72 data including attitude, acceleration, and the like.

The system 10 further includes a steering wheel or hand wheel 92 which communicates with a steering rack 94 that may alter an angular position of steerable road wheels 16 of the vehicle 12. The steering or hand wheel 92 is a human-machine interface (HMI) device that may be grasped by and manipulated by a human operator of the vehicle 12. In an embodiment, the steering or hand wheel 92 is wirelessly connected to the steering rack 94. More specifically, the steering or hand wheel 92 is mechanically and/or electronically connected to a steering emulator 96. The steering emulator 96 wirelessly communicates data from the steering emulator 96 to the steering rack 94 where a steering rack motor 98 mechanically, pneumatically, hydraulically, and/or electronically alters a position of the steering rack 94 and thereby the angular position of the steerable road wheels 16. The steering emulator 96 utilizes kinematics to model a mechanical linkage between the steering rack 94, the hand wheel 92, and the steerable road wheels 16.

In several aspects, the sensory data is obtained from the sensors 70 via the I/O ports 56 by a collaborative steering system application (CSSA 200). The CSSA 200 utilizes the sensory data about the vehicle 12 to determine what the positions of the in-plane actuators 30 and out-of-plane actuators 44 should be to achieve a certain vehicle 12 state, and to provide resilient, redundant, and accurate control of the vehicle's 12 motions.

The CSSA 200 obtains sensory data from the one or more sensors 70 and in-plane and out-of-plane actuators 30, 44 and transfers the sensory data as input signals to a series of CSSA 200 sub-routines that process the sensory data to perform Active, EPS, and/or SBW systems 42 functions. In several aspects, the CSSA 200 maintains steering or hand wheel 92 feedback to vehicle 12 operators during assisted driving with Advanced Driver Assistance System (ADAS) 100 specific steering ratios, and upon termination of ADAS 100 SBW system 42 control, transitions the steering ratio smoothly between the ADAS 100 specific steering ratio(s) and a normal steering ratio depending on a transition factor α.

Figure 2:
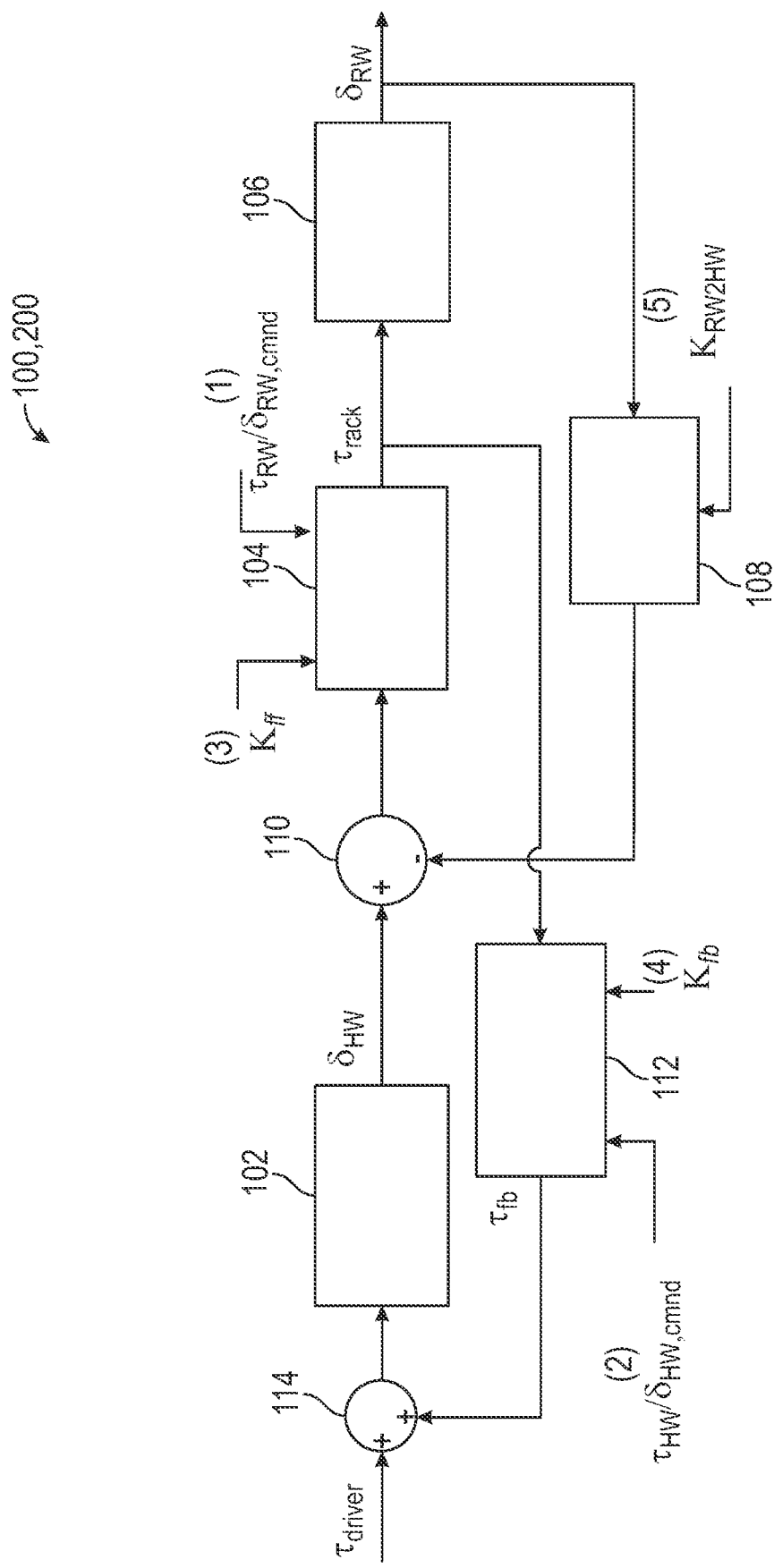
FIG. 2 is a flowchart depicting an architecture for advanced driver assistance system (ADAS) SBW control within the system for collaborative steering in steer-by-wire (SBW) systems for automated driving in vehicles of FIG. 1 according to an exemplary embodiment.

Referring now to FIG. 2 and with continuing reference to FIG. 1, an architecture for ADAS 100 SBW control is shown in additional detail in flowchart form. ADAS 100 SBW control begins with receipt of a vehicle operator torque $\tau_{driver}$ to the hand wheel 92. A change in position of the hand wheel 92 results at block 102, and is represented as hand wheel angle $\delta_{HW}$. At block 104, a rack motor control subroutine of the CSSA 200 receives both a torque or angle command $\tau_{HW}/\delta_{HW,cmnd}$ and a feedforward control gain $K_{ff}$. The torque or angle command $\tau_{HW}/\delta_{HW,cmnd}$ resembles the effect of a vehicle 12 operator command to a traditional steering system in a non SBW vehicle 12. The feedforward control gain $K_{ff}$ adjusts a response rate of the steerable road wheel 16 angles relative to hand wheel 92 input. Accordingly, when $K_{ff}=0$, the hand wheel 92 is freely movable and has no impact on steerable road wheel 16 angles. The rack motor control subroutine at block 104 generates a steering rack 94 torque $\Sigma_{rack}$ which is used as input to road wheel 16 dynamics at block 106, and as an input to a road wheel 16 to hand wheel 92 angle ratio $K_{RW2HW}$ at block 108. From block 106, a road wheel angle $\delta_{RW}$ is generated through the rack motor 98. In several aspects, the road wheel 16 to hand wheel 92 angle ratio $K_{RW2HW}$ adjusts a steering ratio and allows the vehicle 12 operator and/or ADAS 100 to steer more or less harshly or aggressively for any $\delta_{hwa}$ hand wheel angle, or vice versa. The road wheel 16 to hand wheel 92 angle ratio $K_{RW2HW}$ is transmitted as an input and subtracted from the hand wheel angle $\delta_{HW}$ at 110 before being utilized as input to the rack motor 98 control at block 104. In addition to outputting the steering rack 94 torque $\Sigma_{rack}$ to the road wheel 16 dynamics at block 106, the rack motor 98 control 104 sends the steering rack 94 torque $\Sigma_{rack}$ to a feedback or steering emulator 96 motor controller at block 112. The steering emulator 96 controller utilizes the steering rack 94 torque $\Sigma_{rack}$ in combination with a feedback control gain $K_{fb}$, and a torque or angle command at the steering emulator 96 motor controller $\tau_{RW}/\delta_{RW,cmnd}$ as inputs to then generate a feedback torque $\tau_{fb}$ that is received by the steering emulator 96 and summed with the vehicle 12 operator torque $\tau_{driver}$ at 114 to adjust or change the position of the hand wheel 92 at block 102. The feedback control gain $K^{fb}$ defines a feedback response to a torque applied by the rack motor 98 at the steering rack 94, while the torque or angle command at the steering emulator 96 motor controller $\tau_{RW}/\delta_{RW,cmnd}$ are analogous to mechanical feedback from the steering rack 94 in a conventional non SBW steering system.

Figure 3:
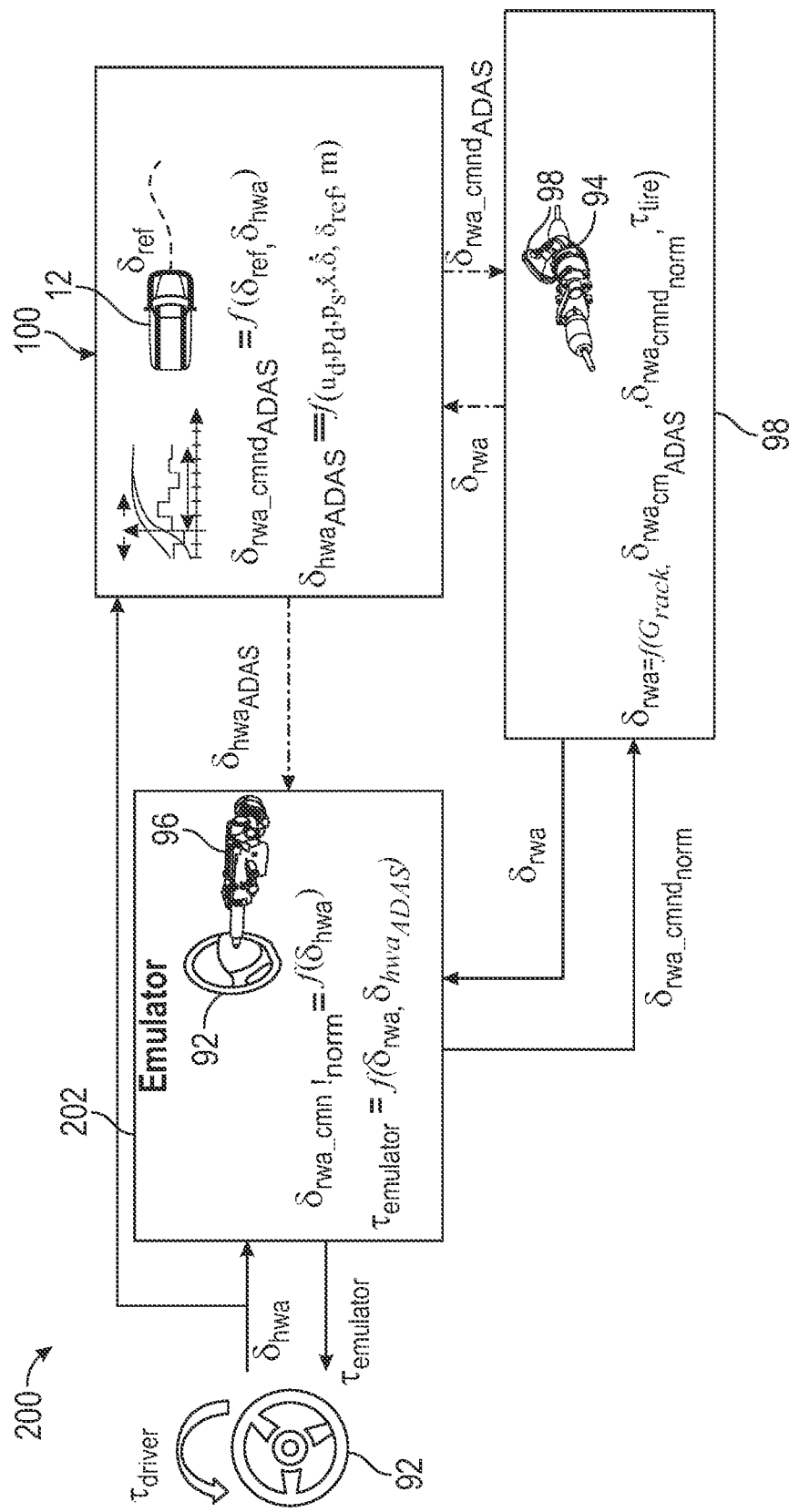
FIG. 3 is a flowchart depicting logical flow of a collaborative steering system application (CSSA) of the system for collaborative steering in steer-by-wire (SBW) systems for automated driving in vehicles of FIG. 1 according to an exemplary embodiment.

Referring now to FIG. 3 and with continuing reference to FIG. 1, a schematic diagram of the CSSA 200 functions is shown generally in flowchart form in further detail. The CSSA 200 begins where a vehicle operator torque $\tau_{driver}$ is applied via the hand wheel 92. The vehicle operator torque $\tau_{driver}$ is an input 210 to the hand wheel 92 that results in $\delta_{hwa}$ hand wheel angle that is taken as an input to both the steering emulator 96 and to the ADAS 100 SBW system 42 control. Based in part on the $\delta_{hwa}$ hand wheel angle, the steering emulator 96 performs steering rack 94 position control defined as $\delta_{rwa\_cmnd_{norm}} = f(\delta_{hwa})$, where $\delta_{rwa\_cmnd}$ defines the steerable road wheel 16 angle command to the rack motor 98 as a function of the $\delta_{hwa}$ hand wheel angle. The steering emulator 96 also provides feedback to the hand wheel 92 through a hand wheel 92 torque emulation defined by $\tau_{emulator} = f(\delta_{rwa}, \delta_{hwa_{ADAS}})$, where $\tau_{emulator}$ is defined as the hand wheel 92 torque feedback from emulator 96 to the vehicle 12 operator. While in full or partial ADAS 100 control, the ADAS 100 steering rack 94 position control is defined as a function of both a reference steering angle $\delta_{ref}$ and the $\delta_{hwa}$ hand wheel angle. The $\delta_{ref}$ is a steering rack 94 position determined by the ADAS 100 in order to follow a vehicle 12 path planned by the ADAS 100. In an embodiment, the steering rack 94 position control while in full or partial ADAS 100 operation may be defined as:

$$\delta_{rwa\_cmnd_{ADAS}} = f(\delta_{ref}, \delta_{hwa}), \text{ where } \delta_{rwa\_cmnd_{ADAS}}$$

is the steerable road wheel 16 angle command to the rack motor 98 during ADAS 100 control.

The rack motor 98 receives steerable road wheel 16 angular position commands from both the ADAS 100 and from the steering emulator 96, and generates a steering rack 94 position based thereon. The steering rack 94 position $\delta_{rwa}$ is a function of the angular position commands from both ADAS 100 and the steering emulator 96, as well as pre-defined data such as a plant model $G_{rack}$ of the rack motor 98, the alignment and/or alignment torque $\tau_{tire}$ from the tires 18 of the steerable road wheels 16, and the like. Accordingly, the steering rack position $\delta_{rwa}$ may be defined as:

$$\delta_{hwa} = f(G_{rack}, \delta_{rwa_{cmnd_{ADAS}}}, \delta_{rwa_{cmnd_{norm}}}, \tau_{tire}).$$

The steering rack motor 98 also sends position data back to the ADAS 100 and emulator 96 so that the ADAS 100 may actively, automatically, adaptively, and continuously update path positioning commands to the rack motor 98 at future time steps, and so that the vehicle 12 operator is informed of the steerable road wheel 16 positions via the hand wheel 92 and emulator torque $\tau_{emulator}$ applied to the hand wheel 92 via the steering emulator 96 as feedback to the vehicle 12 operator.

In several embodiments, the CSSA 200 maintains the ADAS 100 specific steering ratio as a function of the ADAS-commanded hand wheel steering angle $\delta_{hwa_{ADAS}}$ and the ADAS-commanded steerable road wheel 16 angle $$\delta_{rwa\_cmnd_{ADAS}}$$

according to:

$$K_{steer_{ADAS}} = \frac{\delta_{hwa_{ADAS}}}{\delta_{rwa\_cmnd_{ADAS}}}.$$

Similarly, upon termination of ADAS 100 SBW system 42 control, the steering ratio is altered to be a function of the vehicle 12 operator-commanded hand wheel angle $\delta_{hwa}$ and the vehicle 12 operator-commanded steerable road wheel angle $$\delta_{rwa\_cmnd_{norm}}$$

according to:

$$K_{steer_{Norm}} = \frac{\delta_{hwa}}{\delta_{rwa\_cmnd_{norm}}}.$$

The transition between the ADAS 100 steering ratio $K_{steer_{ADAS}}$ and the normal steering ratio $K_{steer_{Norm}}$ is a function of the transition factor $\alpha$, which is a function of vehicle 12 speed, vehicle 12 stability within a lane or on a road surface, a quantity of time since an ADAS 100 override, and the like, and may be represented as:

$$\alpha = f(\text{vehicle speed, stable in lane, time since } ADAS \text{ override}) \in [0, 1].$$

Likewise, when ADAS 100 ceases control: $K_{steer} = \alpha K_{steer_{Norm}} + (1-\alpha)K_{steer_{ADAS}}$. In several aspects, the vehicle 12 operator-commanded steerable road wheel angle $$\delta_{rwa\_cmnd_{norm}}$$

may be defined when ADAS 100 is not operating, as;

$$\delta_{rwa\_cmnd_{norm}} = \delta_{hwa}/K_{steer}.$$

Figure 4:
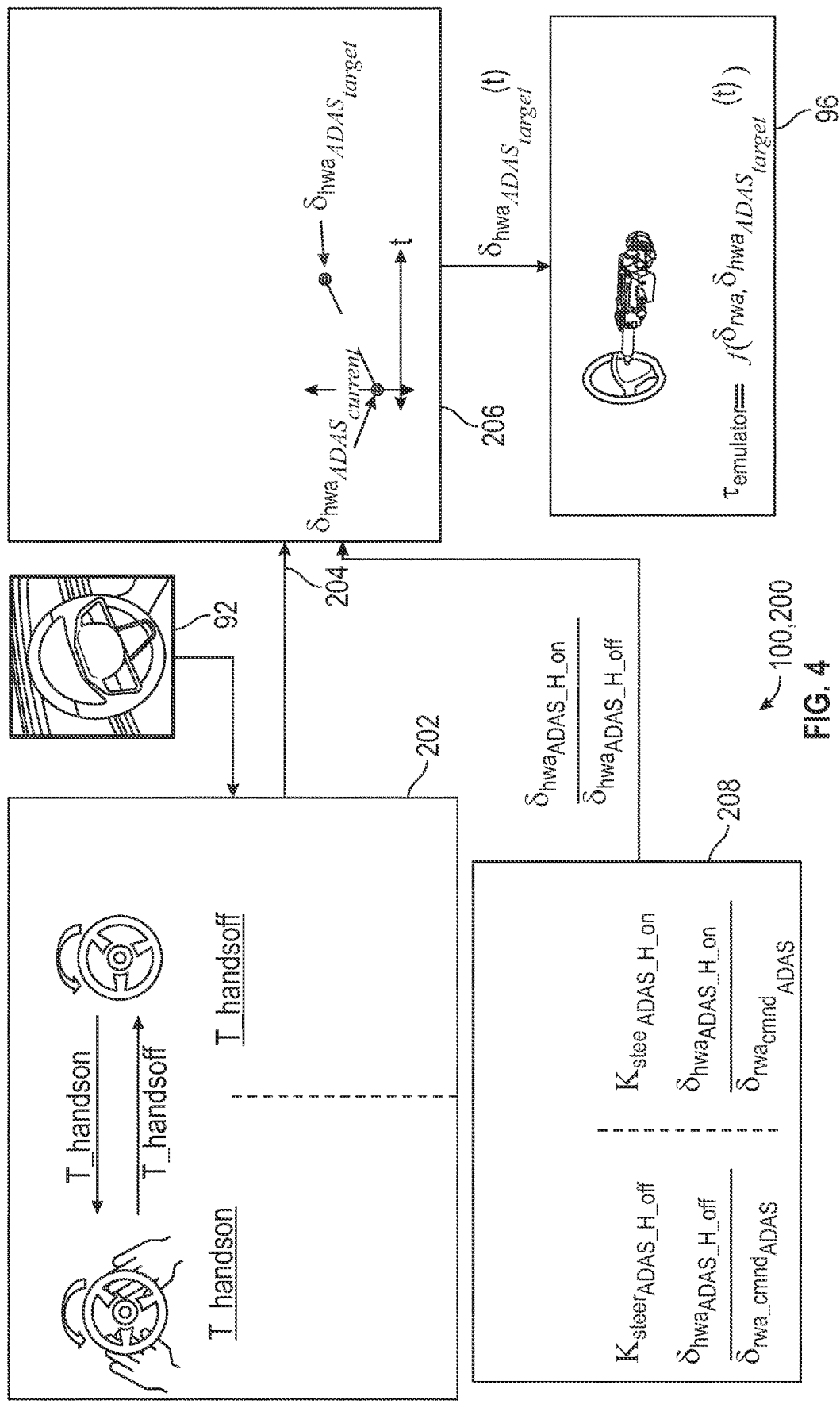
FIG. 4 is a flowchart depicting logical flow of a transition between ADAS SBW control and manual steering control utilizing the CSSA within the system for collaborative steering in steer-by-wire (SBW) systems for automated driving in vehicles of FIGS. 1, 2, and 3 according to an exemplary embodiment.

Turning now to FIG. 4 and with continuing reference to FIGS. 1-3, the transition between ADAS 100 assisted and manual vehicle 12 driving utilizing the CSSA 200 is shown in additional detail. In several aspects, the transition is managed with a transition state machine 202. The transition state machine 202 is a subroutine of the CSSA 200 that utilizes a touch sensor within the hand wheel 92 of the vehicle 12 to determine when the vehicle 12 operator is manually manipulating the hand wheel 92. The touch sensor may be any of a variety of different touch sensitive devices including, but not limited to: capacitive touch sensors, resistive touch sensors, optical imaging touch sensors, surface acoustic wave sensors, infrared sensors, piezoelectric sensors, humidity sensors, and/or force sensors without departing from the scope or intent of the present disclosure. The touch sensor provides the transition state machine 202 with data regarding the current hands on or hands off operational state of the hand wheel 92. In several aspects, the hands on and hands off operational states of the hand wheel 92 are associated with distinct and different steering ratios which may be determined in part on vehicle 12 operator preferences, and the like. The transition state machine 202 determines how long a transition between automated or semi-automated steering and hands-on steering should take. In several aspects, the hands-on state is defined by the touch sensor-based detection of a vehicle 12 operator's hands on the hand wheel 92. A feature escalation state is used to request that the vehicle 12 operator take control of the steering. Feature escalation may be issued in certain predefined and/or exigent situations to request that the vehicle 12 operator take control of the vehicle 12 steering. However, it should be understood that the vehicle 12 operator always has the option to take control at any time. When vehicle 12 operator's hands are detected on the hand wheel 92 and a transition between automated and manual steering is initiated, the system 10 utilizes vehicle 12 operator transition preference information to allow the vehicle 12 operator to take control of the steering in a smooth, comfortable, and easily controllable manner. In some embodiments, the transition between automatic and manual control of steering may be defined or calibrated as a linear change, an exponential change, or the like between the ADAS 100 steering ratio $K_{steer_{ADAS}}$ and the normal steering ratio $K_{steer_{Norm}}$. It will be appreciated that the transition is managed to be predictable, smooth, comfortable, and easily controllable so that vehicle 12 operator comfort and confidence is maintained. In further embodiments, the vehicle 12 operator transition preference information may be learned from vehicle 12 operator behavior over time, and/or may be defined as any of a variety of presets accessible through an instrument cluster, a central control stack, or other such HMI of the vehicle 12, or within an application 68 within a vehicle 12 operator's mobile device in communication with the controllers 50 of the vehicle 12. Likewise, in the hands-off state, the transition state machine 202 determines that the vehicle 12 operator is not manually manipulating the hand wheel 92 via data from the touch sensors, or the like, that the feature state is engaged in a hands-free autonomous or semi-autonomous mode, and utilizing the vehicle 12 operator's transition preferences to manage the transition between manually-steered and autonomously or semi-autonomously controlling the steering rack 94 of the vehicle 12.

When the transition state machine 202 determines that a transition between the manual and automatic control of the steering is required or in process, the transition state machine 202 sets a transition flag 204 as "true" for the hand wheel 92 control transition at block 206. The hand wheel 92 control transition starts when the provided transition flag 204 is true. For some calibratable time "t", the hand wheel 92 transition may be defined as $$\delta_{hwa_{ADAS_{target}}}(t), \text{ where } \delta_{hwa_{ADAS_{target}}}(t)$$

changes linearly, exponentially, or the like with time. Hand wheel 92 control is then emulated via the steering emulator 96 both as a torque emulation $$\tau_{emulator} = f\left(\delta_{rwa}, \delta_{hwa_{ADAS_{target}}}(t)\right)$$

and as a hand wheel 92 angle emulation according to the appropriate manual or automated steering processes in which the vehicle 12 is currently engaged. In several aspects, the steering ratio selection at block 208 may be a vehicle 12 operator-defined calibration, a calibration learned from vehicle 12 operator driving history, or one of any number of presets. The steering ratios include at least a hands-off steering ratio calibration $$K_{steer_{ADAS\_H\_Off}} \text{ where } \frac{\delta_{hwa_{ADAS\_H\_Off}}}{\delta_{rwa\_cmnd_{ADAS}}},$$

applicable when ADAS 100 functions are engaged, and when the vehicle 12 operator is not manually manipulating the hand wheel 92, and a hands-on steering ratio calibration $$K_{steer_{ADAS\_H\_On}} \text{ where } \frac{\delta_{hwa_{ADAS\_H\_On}}}{\delta_{rwa\_cmnd_{ADAS}}}$$

ADAS 100 functions are engaged and the vehicle 12 operator is manually manipulating the hand wheel 92. The hands-on and/or hands-off steering ratio calibrations $$K_{steer_{ADAS\_H\_Off}}, K_{steer_{ADAS\_H\_On}}$$

are used to adjust hand wheel 92 position based on target hand wheel 92 angles $$\delta_{hwa_{ADAS\_H\_On}}/\delta_{hwa_{ADAS\_H\_Off}}$$

and the hand wheel 92 control transition at block 206.

Figure 5:
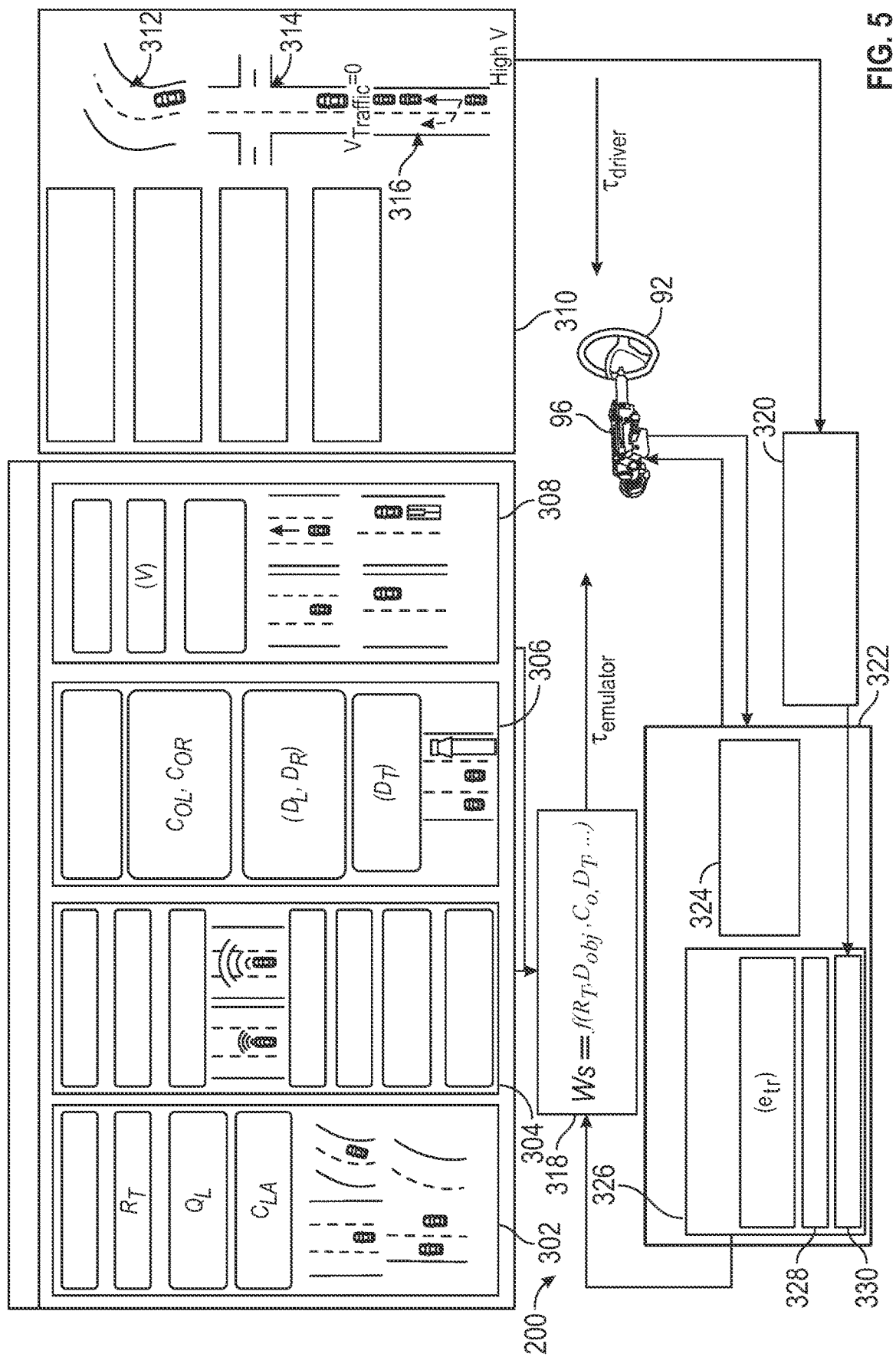
FIG. 5 is a flowchart depicting a selective hand wheel stiffness adjustment process of the CSSA within the system for collaborative steering in steer-by-wire (SBW) systems for automated driving in vehicles of FIGS. 1, 2, 3, and 4 according to an exemplary embodiment.

Turning now to FIG. 5 and with continuing reference to FIGS. 1-4, the hand wheel 92 control of the CSSA 200 includes a hand wheel 92 stiffness adjustment. The system 10 and CSSA 200 manages a stiffness adjustment situationally. That is, a natural-feeling hand wheel 92 stiffness is provided so that in situations where the vehicle 12 is moving at significant speeds, such as at highway speeds, the CSSA 200 increases steering tightness or firmness so that significant or sudden movements of the hand wheel 92 are less likely to be unintentional vehicle 12 operator inputs 210. Accordingly, with tight and/or firm steering at high speeds, the vehicle 12 operator is more likely to be intentionally causing the hand wheel 92 to change position in response to the presence of traffic, curves in a current road segment, or the like. By contrast, the CSSA 200 and the system 10 reduce steering resistance, tightness, or firmness when sudden or significant vehicle 12 operator inputs 210 to the hand wheel 92 are received. That is, because traffic volume is low, the vehicle 12 is moving at a relatively low speed, such as at parking lot speeds, then changes in hand wheel 92 angular position have a decreased likelihood of causing an unintentional vehicle 12 response that could result in collisions or uncontrolled or uncontrollable vehicle 12 movements. In order to provide the predictable, controllable, and comfortable natural-feeling hand wheel 92 stiffness of the vehicle 12 steering, the CSSA 200 utilizes various sensors 70 of the vehicle 12 to determine a current dynamic state 300 of the vehicle 12 as well as a state of the environment surrounding the vehicle 12.

In several aspects, the sensors 70 report road topology information 302, road type information $R_T$, lane quality information $Q_L$, look-ahead curvature information $C_{LA}$ and the like to determine road classification proximate the vehicle 12. That is, the CSSA 200 uses the sensors 70 to determine whether the vehicle 12 is being driven on a multi-lane highway with wide lanes, at high speed, and on a relatively straight path, and with a relatively high quantity of other vehicles in relatively close proximity and traveling in the same or similar directions on the same road segment. By contrast, the CSSA 200 may similarly use the sensors 70 to determine that the vehicle 12 is being driven on a small single-lane country road with many curves and little to no other vehicles in close proximity. It should be appreciated that the CSSA 200 may utilize the sensors 70 to accurately report a road type, shape, traffic, lane size and quality, and the like of any road segment upon which the vehicle 12 is being driven without departing from the scope or intent of the present disclosure.

The CSSA 200 also utilizes the sensors 70 to determine the status of the environment 304 surrounding the vehicle 12 on a given road segment at the current time. In several aspects, the sensors 70 may determine the weather conditions, a view range of the vehicle's 12 sensors 70, or the like. In still further aspects, the sensors 70 report the presence or absence of surrounding objects 306 to the CSSA 200. Such object detection includes object detection confidence calculations $C_{OL}$, $C_{OR}$, a lateral distance $D_L$, $D_R$ to surrounding vehicles 12, a size of a side threat $D_T$, such as a size of another vehicle proximate the host vehicle 12, and the like. The sensors 70 also report vehicle 12 condition information to the CSSA 200 at block 308. The vehicle 12 condition information may include vehicle 12 speed V, whether or not a trailer is attached to the vehicle 12, a current direction of the vehicle 12, and the like.

The CSSA 200 also predicts possible vehicle 12 maneuvers at block 310. More specifically, the CSSA detects whether a turn is imminent based on the road curvature 312, detects intersections 314 in the road as the vehicle 12 approaches the intersections 314, and calculates potential evasive steering maneuvers 316 if and when sudden lane disruptions or other vehicle 12 actions may implicate the continued safe travel of the host vehicle 12. In several aspects, evasive steering maneuvers 316 may be initiated upon finding a substantial disparity the speed of the host vehicle 12 relative to a stopped or very slowly moving other vehicle. That is, when host vehicle 12 speed V is relatively high, and speed $V_{traffic}$ is very low or approaching 0, then the CSSA 200 may initiate an evasive steering maneuver 316 when the host vehicle 12 is within a predefined distance of the other stopped or slow traffic vehicles 12. In addition to performing or initiating the evasive steering maneuver 316, the CSSA 200 increases a steering gain ratio when such an evasive steering maneuver 316 is in process in order to allow the vehicle 12 and the vehicle 12 operator to accurately and safely perform the evasive steering maneuver 316.

In several aspects, the current dynamic state 300 information is used to adjust a hand wheel 92 stiffness at block 318. The hand wheel 92 stiffness component $Ws=f(R_T, D_{obj}, C_O, D_T, \ldots)$ is used to adjust steering feel or feedback to the vehicle 12 operator via adjustments in emulator 96 torque $\tau_{emulator}$. Accordingly a vehicle 12 operator applied torque $\tau_{driver}$ is taken as an input 210 to the CSSA 200 within the controller 50 of the vehicle 12, along with maneuver prediction information 310 in the form of a dynamic steering ratio gain adjustment 320. The hand wheel 92 stiffness component Ws may vary substantially, and should be understood to depend upon availability, driving scenarios, environmental conditions, control tracking performance, and the like. In further aspects, the hand wheel 92 stiffness may vary based on proximity to an intersection 314, when evasive maneuvers are being executed, and/or when the vehicle 12 is turning. Additionally, the hand wheel 92 stiffness may be automatically adjusted in response to vehicle 12 operator attentiveness levels, historical vehicle 12 operator preferences, ADAS 100 trajectory tracking performance and availability, environmental conditions and driving scenario. Stiffness levels may also be adjusted in order to inhibit or otherwise alter the effectiveness of the vehicle 12 operator's inputs 210 to the hand wheel 92 and thereby preventing the vehicle 12 from colliding with obstacles, other vehicles 12, side threats, guard rails, and the like when the sensors 70 detect such obstacles.

The controller 50 then executes control logic of the CSSA 200 that utilizes a predictive control 322 that provides target path adjustment 324 and a vehicle 12 operator weight adjustment. The vehicle 12 operator weight adjustment component 326 considers tracking error $e_{tr}$, dynamic steering ratio and feature availability 328 to generate an output 320 to the hand wheel stiffness adjustment 318. It should be appreciated that the predictive control 322 of the CSSA 200 may be any of a variety of controls or control algorithm types, such as deep learning, model predictive control, classic control algorithms, or the like without departing from the scope or intent of the present disclosure.

Figure 6:
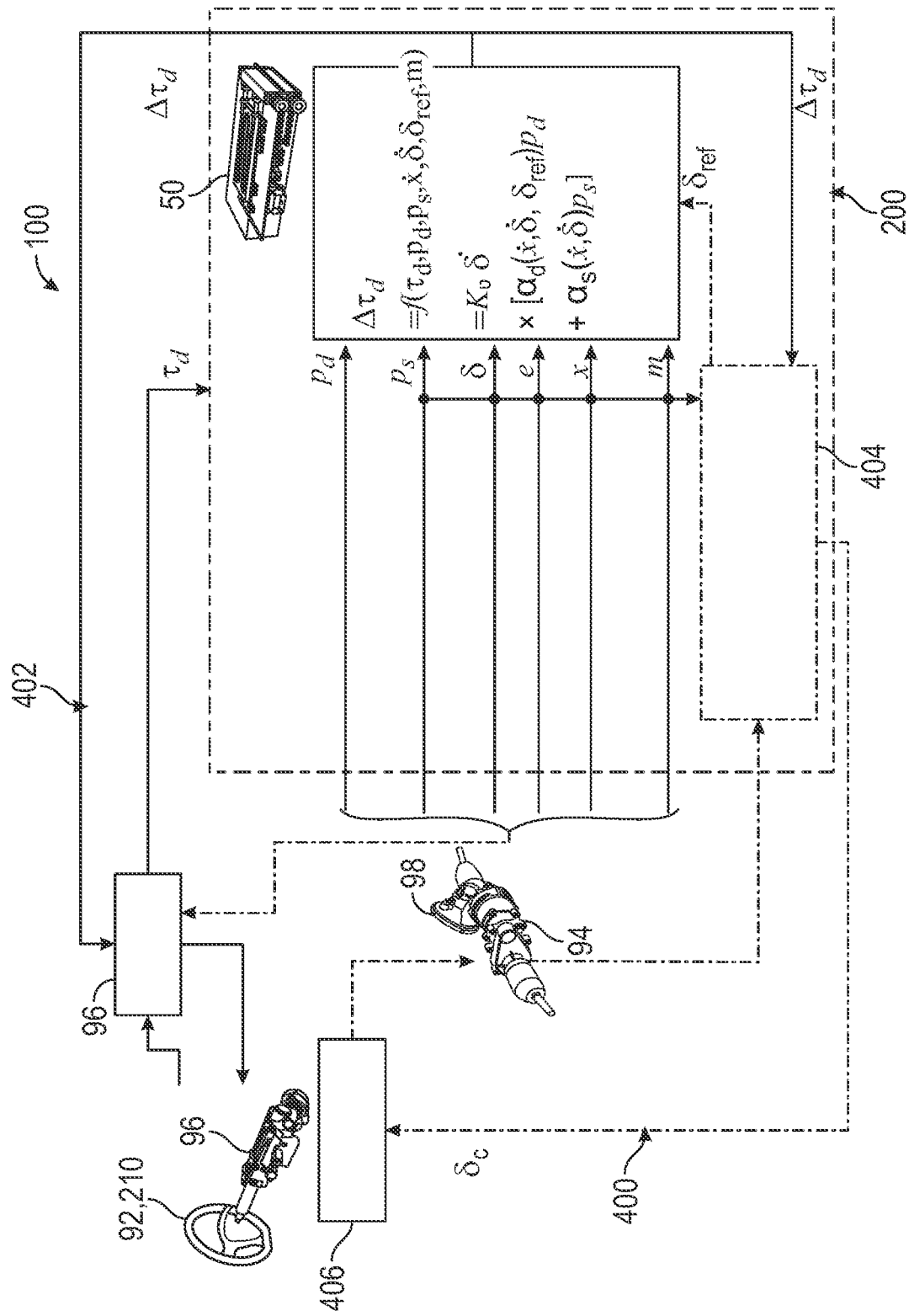
FIG. 6 is a flowchart depicting implementation of the collaborative steering in steer-by-wire system for automated driving in vehicles of FIG. 1, including a collaborative steering trajectory tracking control loop (TTCL) and a collaborative steering vehicle operator feedback control loop (OFCL) according to an exemplary embodiment.

Turning now to FIG. 6 and with continuing reference to FIGS. 1-5, the implementation of the collaborative steering in steer-by-wire system 10 is shown in flowchart form including a collaborative steering trajectory tracking control loop (TTCL) 400 and a collaborative steering vehicle 12 operator feedback control loop (OFCL) 402. Both the TTCL 400 and the OFCL 402 utilize vehicle 12 operator hand wheel 92 input 210 to help determine both a steering feel or hand wheel 92 stiffness generated by the steering emulator 96 and maintain vehicle 12 trajectory tracking via full or partial ADAS 100 operation utilizing an SBW controller 406. In several aspects, the input 210 from the vehicle 12 operator at the hand wheel 92 may include a vehicle 12 operator hand wheel 92 torque input or torque input change. The OFCL 402 hand wheel 92 torque change $\Delta\tau_d$ is a function of a variety of variables including, but not necessarily limited to: a vehicle 12 operator steering preference $p_d$, steering feel customization triggers $p_s$, measured road wheel 16 angles $\delta$, a path following error e, vehicle 12 state information x, and a steering performance mode m, and a desired steering angle command $\delta_{ref}$. The vehicle 12 operator steering preference $p_d$, steering feel customization triggers $p_s$, measured road wheel 16 angles $\delta$, a path following error e, are all generated at least in part by an ADAS 100 computation platform (ACP), which may be a physically or electronically distinct and separate controller 50, or a logical subroutine stored in memory 54 of a single vehicle 12 controller 50 and executed by the processor 52 thereof without departing from the scope or intent of the present disclosure. The vehicle 12 state information x is generated by the various vehicle 12 sensors 70 and actuators 30, 44, while the steering performance mode m is generated by or chosen by vehicle 12 operator via the (EPS) systems, and/or steer-by-wire (SBW) steering systems 42. Thus, the vehicle 12 operator hand wheel 92 torque overlay $\Delta\tau_{df}$ may be expressed as:

$$\Delta\tau_{df} = f(\tau_d, p_d, p_s, \dot{x}, \dot{\delta}, \delta_{ref}, m) = k_v \dot{\delta} \times [\alpha_d(\dot{x}, \dot{\delta}, \delta_{ref})p_d + \alpha_s(\dot{x}, \dot{\delta})p_s],$$

where $k_v$=torque gain response to road wheel angle change; $\alpha_d$=a gain factor for the vehicle 12 operator preference of steering feedback, which is a function of: ($\dot{x}, \dot{\delta}, \delta_{ref}$); and $\alpha_s$=a gain factor for steering feel customization, which is a function of ($\dot{x}, \dot{\delta}$). The above $\Delta\tau_{df}$ equation can be considered to have the following structure: road wheel 16 angle feedback x [vehicle 12 operator preference gain+steering feel customization gain], such that]. So the torque overlay $\Delta\tau_{df}$ feedback to the vehicle 12 operator consists of simulated kinematic feedback from road wheel 16 angle change that is modified by the vehicle 12 operator preference and the steering feel customization.

The TTCL 400 takes the hand wheel 92 torque change $\Delta\tau_d$ as an input to a trajectory tracking controller 404. The trajectory tracking controller 404 may be a separate hardware device similar in construction to the controllers 50 described previously, and/or the trajectory tracking controller 404 may be a control logic, a subroutine, or application 68 stored in memory 54 of the controller 50 and executable by the processor 52 thereof without departing from the scope or intent of the present disclosure. The trajectory tracking controller 404 utilizes data from various sensors 70 and actuators 30, 44 of the vehicle 12 to both determine and follow a planned trajectory, as well as determining a relative position of the vehicle 12 compared to the planned trajectory. The trajectory tracking controller 404 generates and transmits a road wheel 16 angle command $\delta_c$ to an SBW controller 406. The SBW controller 406 may be a subroutine or application 68 within the controller 50, or in some embodiments, within a separate SBW controller or application 68. The SBW controller 406 subsequently commands the rack motor 98 to adjust the angle of the steerable road wheels 16 in response to the road wheel 16 angle command $\delta_c$. The rack motor 98 also sends a desired hand wheel 92 angle to the steering emulator 96, and the steering emulator 96, acting in response to the desired hand wheel 92 angle, alters a position of the hand wheel 92 so that the vehicle 12 operator understands a current direction and trajectory of the vehicle 12. It should be appreciated that the CSSA 200 causes the hand wheel 92 angle and the steerable road wheel 16 angles to be maintained or changed in a manner consistent with vehicle 12 capabilities and vehicle 12 operator preferences and comfort.

The OFCL 402 similarly begins with receipt of the vehicle 12 operator hand wheel 92 torque change $\Delta\tau_d$ as an input. The vehicle 12 operator may also apply a torque to the hand wheel 92. In response to the vehicle 12 operator's applied torque, the hand wheel 92 physically and/or electronically transmits the vehicle 12 operator applied torque $\tau_d$ to the steering emulator 96 and the steering emulator 96 transmits the vehicle 12 operator applied torque $T_d$ measurement to the CSSA 200 controller 50. In response to the vehicle 12 operator applied torque $\tau_d$ and the outputs from the trajectory tracking controller 404, via the SBW controller 406 and the rack motor 98, the desired hand wheel 92 angle signal is modified include a feedback or gain that informs the vehicle 12 operator of changes in road curvature, obstacle and/or vehicle avoidance maneuvers, and assists the vehicle 12 operator in maintaining consistent control of the vehicle 12 in accordance with vehicle 12 capabilities and vehicle 12 operator preferences and comfort.

Figure 7:
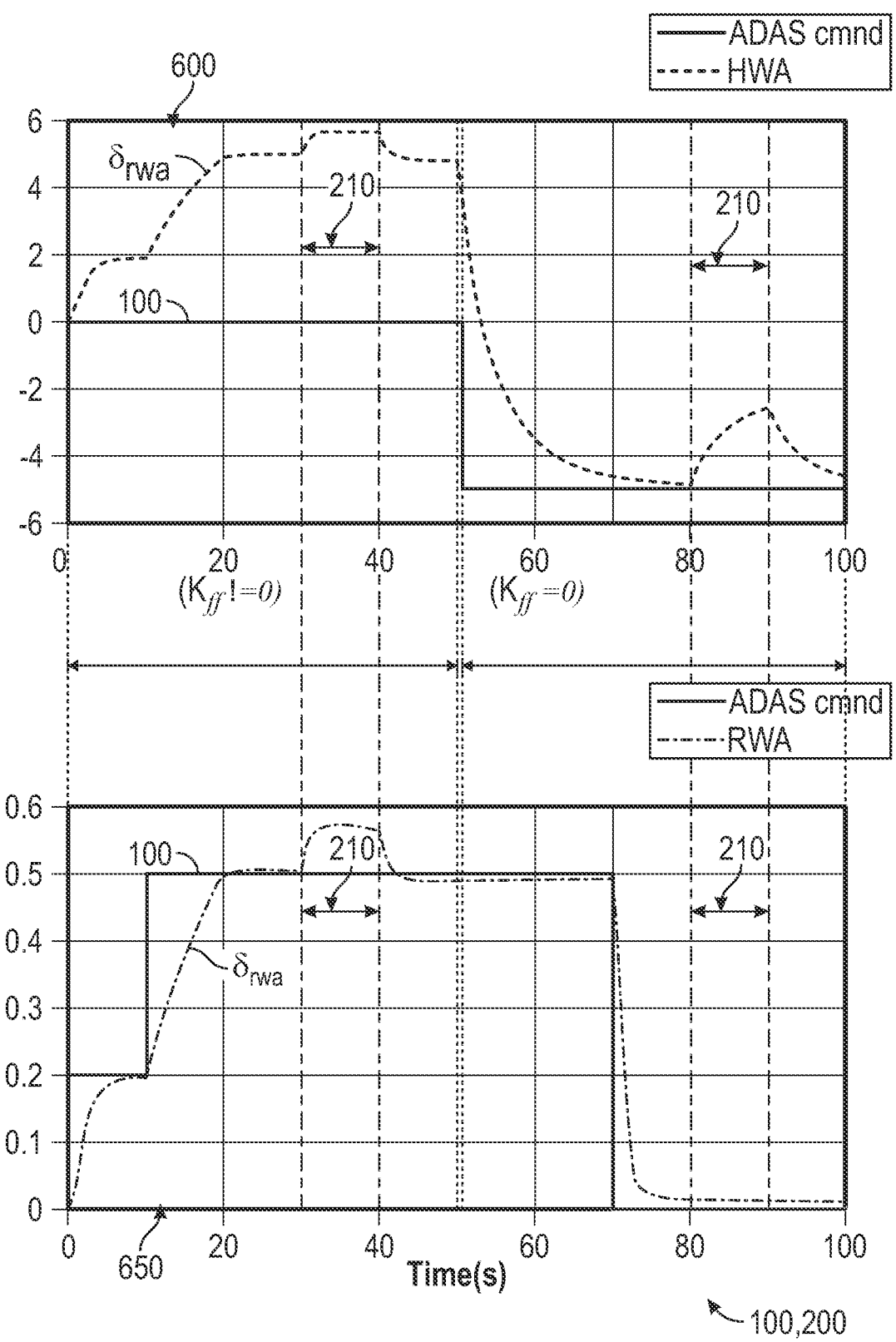
FIG. 7 is a pair of graphical representations of an exemplary hand-off between ADAS SBW control of hand wheel angle without influencing road wheel angle utilizing the collaborative steering in steer-by-wire system for automated driving in vehicles of FIG. 1 according to an exemplary embodiment.

Turning now to FIG. 7 and with continuing reference to FIGS. 1-6, an exemplary hand-off between ADAS 100 control of hand wheel 92 angle without influencing road wheel 16 angle is shown in further detail. More specifically FIG. 7 includes two graphical representations in which the first graph 600 depicts hand wheel 92 angle and the second graph 650 depicts road wheel 16 angle. Both first and second graphs 600, 650 are scaled such that time in seconds is defined on the X-axis, while wheel angle is shown on the Y-axis. As time progresses from left to right in the graphs, it is clear that at time T=50, a connection between the hand wheel 92 angle and the road wheel 16 angle is severed, as the graphs cease tracking one another. The decoupling of the feed-forward gain $K_{ff}$=0 causes the hand wheel 92 and the road wheels 16 to be freely and disconnectedly angularly movable relative to one another. In the example shown in FIG. 7, the hand wheel 92 and road wheels 16 may be decoupled situationally due to a transition to highway driving where sudden changes in steerable wheel 16 position are undesirable. Accordingly, as can be seen beginning at approximately time T=80, and extending through approximately time T=100, despite the fact that the vehicle 12 operator has cause a substantial change in hand wheel 92 angle, the steerable wheel 16 angle remains relatively constant. The perturbation in hand wheel 92 angle from time T=80 through T=100 may, for example, be an inadvertent input 210 to the hand wheel 92 that, under highway driving conditions, if the hand wheel 92 and steerable wheels 16 were fully coupled and moving angularly together, cause the vehicle 12 to respond unpredictably. Thus, by at least situationally preventing unwanted inputs 210 to the hand wheel 92 by the vehicle 12 operator from dramatically altering the angular position of the road wheels 16, vehicle 12 operator comfort and confidence are maintained. In some examples, the vehicle 12 operator may also expressly and intentionally work against the CSSA 200, including counteracting steering inputs commanded by the ADAS 100. In such situations, the CSSA 200 does not fully prevent the vehicle 12 operator steering inputs 210, but rather smooths the vehicle 12 operator's inputs 210 to maintain vehicle 12 stability, comfort, and vehicle 12 operator confidence.

A system 10 for collaborative steering in SBW equipped vehicles 12 having autonomous driving capabilities of the present disclosure offers several advantages. These include the ability to provide consistent, confidence-inspiring and connected steering feel via the hand wheel 92 as well as providing consistent vehicle 12 dynamics, including acceleration, deceleration, lateral acceleration, and the like, via the road wheel 16 and the steering rack actuator 98. The system 10 of the present disclosure further improves operator comfort, increases a sense of connectedness between movements of the road wheels 16 and the hand wheel 92, and provides for effective and smooth transitions between autonomous, ADAS 100 controlled driving and manual steering movements while maintaining or decreasing system 10 component complexity, providing redundancy. Furthermore, the system 10 of the present disclosure may be applied both to new vehicles 12 as well as being retrofittable to existing vehicles 12 with appropriate hardware SBW steering systems 42 while maintaining or decreasing system 10 hardware complexity. The system 10 of the present disclosure provides a novel architecture and methodology for automated and collaborative steering in SBW systems 42. The ADAS 100 computes a set of commands including road wheel 16 angle and a steering rack 94 torque required to achieve the road wheel 16 angle within a set quantity of time. The ADAS 100 also generates a feedback command to the steering emulator 96 as well as a dynamic steering ratio command. The CSSA 200 enables dynamic steering ratios in ADAS 100 applications, collaborative steering between vehicle 12 operator and full ADAS 100 control, as well as automatically, adaptively, and continuously adjusting steering feel, and providing situation-aware steering response and enabling smooth transitions between ADAS 100 control and manual or vehicle 12 operator only control.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A system for collaborative steering in steer-by-wire (SBW) equipped vehicles, the system comprising:
   a vehicle;
   one or more sensors equipped to the vehicle and collecting static and dynamic information about the vehicle, and an environment surrounding the vehicle;
   a steering rack motor disposed on a steering rack of the vehicle, the steering rack motor selectively adjusting an angular position of one or more steerable road wheels of the vehicle;
   a steering emulator connected to a hand wheel of the vehicle and selectively generating a torque to and adjusting an angular position of the hand wheel, the steering emulator and the steering rack motor in electronic communication with one another;
   a controller having a processor, a memory, and one or more input/output (I/O) ports, the I/O ports communicating with the one or more sensors and the steering rack motor and the steering emulator, the processor executing programmatic control logic stored in the memory, the programmatic control logic including a collaborative steering system application (CSSA), the CSSA comprising:
   a first control logic that obtains, from the one or more sensors and from the steering emulator and the steering rack motor, static and dynamic information about the vehicle and the environment surrounding the vehicle;
   a second control logic that, in response to the static and dynamic information, generates one or more of a rack torque command and a rack angle command to the steering rack motor and generates one or more of an emulator torque command and an emulator angle command to the steering emulator;
   a third control logic that determines a steering ratio between angular movement of the steerable road wheels and angular movement of the hand wheel, wherein the steering ratio is dynamically adjustable from at least an ADAS steering ratio to a manual steering ratio different from the ADAS steering ratio;
   a fourth control logic that selectively automatically transitions vehicle steering control between automated driver assistance system (ADAS) SBW control and manual steering control;
   a fifth control logic that smooths transitions between ADAS SBW control and manual steering control;
   a sixth control logic that automatically and dynamically adjusts a hand wheel stiffness by altering the emulator torque command in response to data from the one or more sensors and from the steering emulator and the steering rack motor; and
   a seventh control logic that coordinates a vehicle operator feedback control loop with a trajectory tracking control loop for ADAS, and causes the steering rack motor and the steering emulator to operate according to a kinematic model of a mechanical linkage between the steering rack, the hand wheel, and the steerable road wheels while providing variable control gains that adapt road wheel response and vehicle operator steering feel based on driving scenario and driving features currently enabled.

2. The system of claim 1 wherein the first control logic further comprises:
   control logic for obtaining static and dynamic information about the vehicle including: a vehicle speed, a presence or absence of a trailer attached to the vehicle, a current road wheel angle, a current hand wheel angle; and
   control logic for obtaining information about the environment surrounding the vehicle including: a topology of a road segment proximate the vehicle, a road type, a lane quality, a look ahead curvature, current weather conditions, a field of view and view range of the one or more sensors, object detection confidence, a lateral distance to surrounding vehicles, a size of a side threat, a presence of an intersection, and a potential evasive steering maneuver.

3. The system of claim 1, wherein the second control logic further comprises:
   control logic that determines a desired steerable road wheel angle and communicates the steering rack torque and/or angle command to the steering rack motor, wherein upon receipt of the steering rack torque and/or angle command, the steering rack motor generates a torque output that alters an angle of the steerable road wheels; and
   control logic that determines a desired hand wheel angle based in part on the steerable road wheel angle and a steering ratio at a current time step; and communicates the emulator torque and/or angle command to the steering emulator, wherein upon receipt of the emulator torque and/or angle command, the steering emulator generates a torque output that alters an angle of the hand wheel.

4. The system of claim 1, wherein the third control logic dynamically adjusts the steering ratio in response to the static and dynamic information about the vehicle, and the environment surrounding the vehicle.

5. The system of claim 1, wherein the fourth control logic selectively and automatically transitions vehicle steering control between automated driver assistance system (ADAS) SBW control and manual steering control, based on the static and dynamic information about the vehicle and the environment surrounding the vehicle, based on a currently active ADAS feature, and based on a current hands on or hands off operational state of the hand wheel.

6. The system of claim 5, wherein the hands on and hands off operational states of the hand wheel are dictated by a touch sensor that ascertains a presence and/or absence of a vehicle operator's hands on the hand wheel, and wherein upon determining that the vehicle is operating in a hands off operational state, the system selectively engages a feature escalation state that requests the vehicle operator take control of the steering.

7. The system of claim 1, wherein the fifth control logic further comprises:
   control logic that smooths transitions between ADAS SBW control and manual steering control by maintaining feedback to the hand wheel during assisted driving and controlling a timing and rate of transition with a transition factor $\alpha$, wherein the transition factor $\alpha$ depends on vehicle speed, stable in lane condition, and time since ADAS SBW control disengagement occurred; such that:

$$K_{steer} = \alpha K_{steer_{Norm}} + (1 - \alpha) K_{steer_{ADAS}};$$

$\alpha = f(\text{vehicle speed, stable in lane, time since } ADAS \text{ override}) \in [0, 1];$ and $$\delta_{rwa_{cmnd_{norm}}} = \frac{\delta_{hwa}}{K_{steer}},$$

where $K_{steer_{ADAS}}$ is the ADAS steering ratio defined as $$K_{steer_{ADAS}} = \frac{\delta_{hwa_{ADAS}}}{\delta_{rwa_{cmnd_{ADAS}}}};$$

$K_{steer_{Norm}}$, is the manual steering ratio defined as $$K_{steer_{Norm}} = \frac{\delta_{hwa}}{\delta_{rwa_{cmnd_{norm}}}};$$

$\delta_{hwa_{ADAS}}$ is a hand wheel angle commanded by ADAS, and $$\delta_{rwa_{cmnd_{ADAS}}}$$

is a road wheel angle commanded by ADAS; $\delta_{hwa}$ is an operator-commanded hand wheel angle;

$$\delta_{rwa_{cmnd_{norm}}}$$

is a road wheel angle commanded by the vehicle operator.

8. The system of claim 1, wherein the sixth control logic further comprises:
   control logic that automatically and dynamically adjusts a hand wheel stiffness by adjusting steering emulator torque outputs based on static and dynamic information about the vehicle and information about the environment surrounding the vehicle obtained within the first control logic, and based on vehicle operator attentiveness levels, vehicle operator historical preferences, ADAS SBW control trajectory tracking performance and availability, including obstacles identified by the one or more sensors; and
   control logic that identifies obstacles and both inhibits the vehicle operator from causing the vehicle to collide with the obstacles and assists the vehicle operator in navigating dynamic driving scenarios by dynamically adjusting a steering ratio gain and altering an effectiveness of vehicle operator inputs to the hand wheel.

9. The system of claim 1, wherein the seventh control logic further comprises:
   control logic for collaborative steering feedback that receives vehicle state information, control commands, and steering characteristics and generates a hand wheel torque overlay command, wherein the hand wheel torque overlay command is sent to the steering emulator and overlayed with vehicle operator torque inputs, and a coordinated desired steering angle command is sent to the steering rack motor, wherein the hand wheel torque overlay is defined as:

$$\Delta \tau_{df} = f(\tau_d, p_d, p_s, \dot{x}, \delta, \delta_{ref}, m) = k_v \delta \times [\alpha_d(\dot{x}, \delta, \delta_{ref})p_d + \alpha_s(\dot{x}, \delta)p_s]$$

where $\tau_d$ is a vehicle operator applied hand wheel torque; $p_d$ is a vehicle operator preference; $p_s$ is a steering feel customization trigger; $\delta$ is a measured road wheel angle; e is a trajectory following error; x is a vehicle state; m is a steering performance mode; $\delta_{ref}$ is a desired steering angle command; $\delta_c$ is a road wheel angle command; and $k_v$ is a variable gain.

10. A method for collaborative steering in steer-by-wire (SBW) equipped vehicles, the method comprising:
  collecting, with one or more sensors equipped to and disposed on a vehicle, and static and dynamic information about the vehicle, and an environment surrounding the vehicle;
  selectively adjusting an angular position of one or more steerable road wheels of the vehicle with a steering rack motor disposed on a steering rack of the vehicle;
  selectively generating a torque to and adjusting an angular position of a hand wheel with a steering emulator connected to the hand wheel of the vehicle, the steering emulator and the steering rack motor in electronic communication with one another;
  executing programmatic control logic including a collaborative steering system application (CSSA) stored in memory of a controller of the vehicle, the controller having a processor, the memory, and one or more input/output (I/O) ports, the I/O ports communicating with the one or more sensors and the steering rack motor and the steering emulator, the CSSA comprising:
  obtaining, from the one or more sensors and from the steering emulator and the steering rack motor, static and dynamic information about the vehicle and the environment surrounding the vehicle;
  generating, in response to the static and dynamic information, one or more of a rack torque command and a rack angle command to the steering rack motor and generates one or more of an emulator torque and/or angle command to the steering emulator; determining a steering ratio between angular movement of the steerable road wheels and angular movement of the hand wheel, wherein the steering ratio is dynamically adjustable from at least an ADAS steering ratio to a manual steering ratio different from the ADAS steering ratio;
  selectively automatically transitioning vehicle steering control between automated driver assistance system (ADAS) SBW control and manual steering control;
  smoothing transitions between ADAS SBW control and manual steering control;
  automatically and dynamically adjusting a hand wheel stiffness by altering the emulator torque command in response to data from the one or more sensors and from the steering emulator and the steering rack motor; and
  coordinating a vehicle operator feedback control loop with a trajectory tracking control loop for ADAS, and causing the steering rack motor and the steering emulator to operate according to a kinematic model of a mechanical linkage between the steering rack, the hand wheel, and the steerable road wheels while providing variable control gains that adapt road wheel response and vehicle operator steering feel based on driving scenario and driving features currently enabled.

11. The method of claim 10 further comprising:
  obtaining static and dynamic information about the vehicle including: a vehicle speed, a presence or absence of a trailer attached to the vehicle, a current road wheel angle, a current hand wheel angle; and
  obtaining information about the environment surrounding the vehicle including: a topology of a road segment proximate the vehicle, a road type, a lane quality, a look ahead curvature, current weather conditions, a field of view and view range of the one or more sensors, object detection confidence, a lateral distance to surrounding vehicles, a size of a side threat, a presence of an intersection, and a potential evasive steering maneuver.

12. The method of claim 10 further comprising:
  determining a desired steerable road wheel angle and communicates the rack torque and/or angle command to the steering rack motor, wherein upon receipt of the rack torque and/or angle command, the steering rack motor generates a torque output that alters an angle of the steerable road wheels; and
  determining a desired hand wheel angle based in part on the steerable road wheel angle and a steering ratio at a current time step; and communicates the emulator torque and/or angle command to the steering emulator, wherein upon receipt of the emulator torque and/or angle command, the steering emulator generates a torque output that alters an angle of the hand wheel.

13. The method of claim 10, further comprising:
  dynamically adjusting the steering ratio in response to the static and dynamic information about the vehicle, and the environment surrounding the vehicle.

14. The method of claim 10, further comprising:
  selectively and automatically transitioning vehicle steering control between automated driver assistance system (ADAS) control and manual steering control, based on the static and dynamic information about the vehicle and the environment surrounding the vehicle, based on a currently active ADAS feature, and based on a current hands on or hands off operational state of the hand wheel.

15. The method of claim 14, further comprising:
  dictating the hands on and hands off operational states of the hand wheel via a touch sensor that ascertains a presence and/or absence of a vehicle operator's hands on the hand wheel, and wherein upon determining that the vehicle is operating in a hands off operational state; and
  selectively engaging a feature escalation state that requests the vehicle operator take control of the steering.

16. The method of claim 10, further comprising:
  smoothing transitions between ADAS SBW control and manual steering control by maintaining feedback to the hand wheel during assisted driving and controlling a timing and rate of transition with a transition factor $\alpha$, wherein the transition factor $\alpha$ depends on vehicle speed, stable in lane condition, and time since ADAS SBW control disengagement occurred, such that:

$$K_{steer} = \alpha K_{steer_{Norm}} + (1-\alpha)K_{steer_{ADAS}};$$

$\alpha = f(\text{vehicle speed, stable in lane, time since } ADAS \text{ override}) \in [0, 1];$ and $$\delta_{rwa_{cmnd_{norm}}} = \frac{\delta_{hwa}}{K_{steer}},$$

where $K_{steer_{ADAS}}$ is the ADAS steering ratio defined as $$K_{steer_{ADAS}} = \frac{\delta_{hwa_{ADAS}}}{\delta_{rwa_{cmnd_{ADAS}}}};$$

$K_{steer_{Norm}}$, is the manual steering ratio defined as $$K_{steer_{Norm}} = \frac{\delta_{hwa}}{\delta_{rwa_{cmnd_{norm}}}};$$

$\delta_{hwa_{ADAS}}$ is a hand wheel angle commanded by ADAS, and $$\delta_{rwa_{cmnd_{ADAS}}}$$

is a road wheel angle commanded by ADAS; $\delta_{hwa}$ is an operator-commanded hand wheel angle;

$$\delta_{rwa_{cmnd_{norm}}}$$

is a road wheel angle commanded by the vehicle operator.

17. The method of claim 10, further comprising:
automatically and dynamically adjusting a hand wheel stiffness by adjusting steering emulator torque outputs based on static and dynamic information about the vehicle and information about the environment surrounding the vehicle obtained within by the one or more sensors, from the steering rack motor and from the steering emulator, and based on vehicle operator attentiveness levels, vehicle operator historical preferences, ADAS SBW control trajectory tracking performance and availability, including obstacles identified by the one or more sensors; and
identifying obstacles and both inhibits the vehicle operator from causing the vehicle to collide with the obstacles and assists the vehicle operator in navigating dynamic driving scenarios by dynamically adjusting a steering ratio gain and altering an effectiveness of vehicle operator inputs to the hand wheel.

18. The method of claim 10, further comprising:
activating collaborative steering feedback and receiving vehicle state information, control commands, and steering characteristics; and generating a hand wheel torque overlay command, wherein the hand wheel torque overlay command is sent to the steering emulator and overlayed with vehicle operator torque inputs, and a coordinated desired steering angle command is sent to the steering rack motor, wherein the hand wheel torque overlay is defined as:

$$\Delta\tau_{df} = f(\tau_d, p_d, p_s, \dot{x}, \delta, \delta_{ref}, m) = k_v \delta \times [\alpha_d(\dot{x}, \delta, \delta_{ref})p_d + \alpha_s(\dot{x}, \delta)p_s]$$

where $\tau_d$ is a vehicle operator applied hand wheel torque; $p_d$ is a vehicle operator preference; $p_s$ is a steering feel customization trigger; $\delta$ is a measured road wheel angle; e is a trajectory following error; x is a vehicle state; m is a steering performance mode; $\delta_{ref}$ is a desired steering angle command; $\delta_c$ is a road wheel angle command; and $k_v$ is a variable gain.

19. A system for collaborative steering in steer-by-wire (SBW) equipped vehicles, the system comprising:
a vehicle;
one or more sensors equipped to the vehicle and collecting static and dynamic information about the vehicle, and an environment surrounding the vehicle;
a steering rack motor disposed on a steering rack of the vehicle, the steering rack motor selectively adjusting an angular position of one or more steerable road wheels of the vehicle;
a steering emulator connected to a hand wheel of the vehicle and selectively generating a torque to and adjusting an angular position of the hand wheel, the steering emulator and the steering rack motor in electronic communication with one another;
a controller having a processor, a memory, and one or more input/output (I/O) ports, the I/O ports communicating with the one or more sensors and the steering rack motor and the steering emulator, the processor executing programmatic control logic stored in the memory, the programmatic control logic including a collaborative steering system application (CSSA), the CSSA comprising:
a first control logic that obtains, from the one or more sensors and from the steering emulator and the steering rack motor, static and dynamic information about the vehicle and the environment surrounding the vehicle, including: a vehicle speed, a presence or absence of a trailer attached to the vehicle, a current road wheel angle, a current hand wheel angle, and that obtains information about the environment surrounding the vehicle including: a topology of a road segment proximate the vehicle, a road type, a lane quality, a look ahead curvature, current weather conditions, a field of view and view range of the one or more sensors, object detection confidence, a lateral distance to surrounding vehicles, a size of a side threat, a presence of an intersection, and a potential evasive steering maneuver;
a second control logic that, in response to the static and dynamic information, generates one or more of a rack torque command and a rack angle command to the steering rack motor and generates one or more of an emulator torque command and an emulator angle to the steering emulator; determines a desired steerable road wheel angle and communicates the rack torque and/or angle command to the steering rack motor, wherein upon receipt of the rack torque and/or angle command, the steering rack motor generates a torque output that alters an angle of the steerable road wheels; and determines a desired hand wheel angle based in part on the steerable road wheel angle and a steering ratio at a current time step; and communicates the emulator torque and/or angle command to the steering emulator, wherein upon receipt of the emulator torque and/or angle command, the steering emulator generates a torque output that alters an angle of the hand wheel;
a third control logic that determines a steering ratio between angular movement of the steerable road wheels and angular movement of the hand wheel, wherein the steering ratio is dynamically adjustable from at least an ADAS steering ratio to a manual steering ratio different from the ADAS steering ratio and dynamically adjusts the steering ratio in response to the static and dynamic information about the vehicle, and the environment surrounding the vehicle;

a fourth control logic that selectively and automatically transitions vehicle steering control between automated driver assistance system (ADAS) control and manual steering control, based on the static and dynamic information about the vehicle and the environment surrounding the vehicle, based on a currently active ADAS feature, and based on a current hands on or hands off operational state of the hand wheel;

a fifth control logic that smooths transitions between ADAS SBW control and manual steering control by maintaining feedback to the hand wheel during assisted driving and controlling a timing and rate of transition with a transition factor α, wherein the transition factor α depends on vehicle speed, stable in lane condition, and time since ADAS SBW control disengagement occurred; such that:

$$K_{steer} = \alpha K_{steer_{Norm}} + (1 - \alpha) K_{steer_{ADAS}};$$

$$\alpha = f(\text{vehicle speed, stable in lane, time since } ADAS \text{ override}) \in [0, 1];$$

and $$\delta_{rwa_{cmnd_{norm}}} = \frac{\delta_{hwa}}{K_{steer}},$$

where $K_{steer_{ADAS}}$ is the ADAS steering ratio defined as $$K_{steer_{ADAS}} = \frac{\delta_{hwa_{ADAS}}}{\delta_{rwa_{cmnd_{ADAS}}}};$$

$K_{steer_{Norm}}$, is the manual steering ratio defined as $$K_{steer_{Norm}} = \frac{\delta_{hwa}}{\delta_{rwa_{cmnd_{norm}}}};$$

$\delta_{hwa_{ADAS}}$ is a hand wheel angle commanded by ADAS, and $$\delta_{rwa_{cmnd_{ADAS}}}$$

is a road wheel angle commanded by ADAS; $\delta_{hwa}$ is an operator-commanded hand wheel angle;

$$\delta_{rwa_{cmnd_{norm}}}$$

is a road wheel angle commanded by a vehicle operator;

a sixth control logic that automatically and dynamically adjusts a hand wheel stiffness by altering the emulator torque and/or angle command in response to data from the one or more sensors and from the steering emulator and the steering rack motor, and in response to vehicle operator attentiveness levels, vehicle operator historical preferences, ADAS SBW control trajectory tracking performance and availability, including obstacles identified by the one or more sensors; automatically identifies obstacles and both inhibits the vehicle operator from causing the vehicle to collide with the obstacles and assists the vehicle operator in navigating dynamic driving scenarios by dynamically adjusting a steering ratio gain and altering an effectiveness of vehicle operator inputs to the hand wheel; and a seventh control logic that coordinates a vehicle operator feedback control loop with a trajectory tracking control loop for ADAS, including control logic for collaborative steering feedback that receives vehicle state information, control commands, and steering characteristics and generates a hand wheel torque overlay command, wherein the hand wheel torque overlay command is sent to the steering emulator and overlayed with vehicle operator torque inputs, and a coordinated desired steering angle command is sent to the steering rack motor, wherein the hand wheel torque overlay is defined as:

$$\Delta \tau_{df} = f(\tau_d, p_d, p_s, \dot{x}, \dot{\delta}, \delta_{ref}, m) = k_v \dot{\delta} \times [\alpha_d(\dot{x}, \dot{\delta}, \delta_{ref}) p_d + \alpha_s(\dot{x}, \dot{\delta}) p_s]$$

where $\tau_d$ is a vehicle operator applied hand wheel torque; $p_d$ is a vehicle operator preference; $p_s$ is a steering feel customization trigger; $\delta$ is a measured road wheel angle; e is a trajectory following error; x is a vehicle state; m is a steering performance mode; $\delta_{ref}$ is a desired steering angle command; $\delta_c$ is a road wheel angle command; and $k_v$ is a variable gain; and control logic that causes the steering rack motor and the steering emulator to operate according to a kinematic model of a mechanical linkage between the steering rack, the hand wheel, and the steerable road wheels while providing variable control gains that adapt road wheel response and vehicle operator steering feel based on driving scenario and driving features currently enabled.

20. The system of claim 19, wherein the hands on and hands off operational states of the hand wheel are dictated by a touch sensor that ascertains a presence and/or absence of a vehicle operator's hands on the hand wheel, and wherein upon determining that the vehicle is operating in a hands off operational state, the system selectively engages a feature escalation state that requests the vehicle operator take control of the steering.

* * * * *